(12) United States Patent
Shaw

(10) Patent No.: US 9,108,728 B2
(45) Date of Patent: Aug. 18, 2015

(54) MODULAR FLYING VEHICLE

(71) Applicant: Donald Orval Shaw, El Segundo, CA (US)

(72) Inventor: Donald Orval Shaw, El Segundo, CA (US)

( * ) Notice: Subject to any disclaimer, the term of this patent is extended or adjusted under 35 U.S.C. 154(b) by 250 days.

(21) Appl. No.: 13/907,975

(22) Filed: Jun. 3, 2013

(65) Prior Publication Data

US 2014/0151496 A1    Jun. 5, 2014

Related U.S. Application Data

(62) Division of application No. 12/070,699, filed on Feb. 19, 2008, now Pat. No. 8,453,962.

(60) Provisional application No. 60/901,809, filed on Feb. 16, 2007.

(51) Int. Cl.
| | |
|---|---|
| *B64C 27/08* | (2006.01) |
| *B64C 27/52* | (2006.01) |
| *B64C 27/20* | (2006.01) |
| *B64C 29/00* | (2006.01) |

(52) U.S. Cl.
CPC .................. *B64C 27/52* (2013.01); *B64C 27/20* (2013.01); *B64C 29/0033* (2013.01); *B64C 2201/027* (2013.01); *B64C 2201/128* (2013.01)

(58) Field of Classification Search
None
See application file for complete search history.

(56) References Cited

U.S. PATENT DOCUMENTS

| | | | | | |
|---|---|---|---|---|---|
| 1,386,713 | A | * | 8/1921 | Leinweber et al. | 244/66 |
| 1,794,202 | A | * | 2/1931 | Pickard | 244/66 |
| 3,002,712 | A | * | 10/1961 | Beckwith | 244/17.23 |
| 3,081,964 | A | * | 3/1963 | Quenzler | 244/7 R |
| 3,181,810 | A | * | 5/1965 | Olson | 244/7 R |
| 3,578,263 | A | * | 5/1971 | Gunter et al. | 244/7 A |
| 4,116,405 | A | * | 9/1978 | Bacchi et al. | 244/12.4 |
| 4,136,845 | A | * | 1/1979 | Eickmann | 244/54 |
| 4,387,866 | A | * | 6/1983 | Eickmann | 244/7 C |
| 4,492,353 | A | * | 1/1985 | Phillips | 244/12.4 |
| 5,419,514 | A | * | 5/1995 | Ducan | 244/12.4 |
| 5,839,691 | A | * | 11/1998 | Lariviere | 244/7 R |
| 6,286,783 | B1 | * | 9/2001 | Kuenkler | 244/30 |
| 6,655,631 | B2 | * | 12/2003 | Austen-Brown | 244/12.4 |
| 6,719,244 | B1 | * | 4/2004 | Gress | 244/7 R |
| 6,883,748 | B2 | * | 4/2005 | Yoeli | 244/12.3 |
| 6,886,776 | B2 | * | 5/2005 | Wagner et al. | 244/12.4 |
| 6,896,221 | B1 | * | 5/2005 | Einarsson | 244/7 C |
| 7,472,863 | B2 | * | 1/2009 | Pak | 244/12.5 |
| 7,675,189 | B2 | * | 3/2010 | Grenier | 290/54 |
| 7,699,260 | B2 | * | 4/2010 | Hughey | 244/17.23 |
| 7,753,309 | B2 | * | 7/2010 | Garreau | 244/12.4 |
| 7,802,754 | B2 | * | 9/2010 | Karem | 244/7 C |
| 7,857,253 | B2 | * | 12/2010 | Yoeli | 244/12.3 |
| 8,020,804 | B2 | * | 9/2011 | Yoeli | 244/23 D |
| 8,646,720 | B2 | * | 2/2014 | Shaw | 244/17.23 |
| 2007/0221779 | A1 | * | 9/2007 | Ikeda | 244/7 A |

* cited by examiner

*Primary Examiner* — Christopher P Ellis
*Assistant Examiner* — Medhat Badawi
(74) *Attorney, Agent, or Firm* — Richard B. Cates

(57) ABSTRACT

The invention is a modular vehicle having an air vehicle that can be coupled to cargo containers, land vehicles, sea vehicles, medical transport modules, etc. In one embodiment the air vehicle has a plurality of propellers positioned around a main airframe, which can provide vertical thrust and/or horizontal thrust. One or more of the propellers may be configured to tilt forward, backward, and/or side-to-side with respect to the airframe.

7 Claims, 27 Drawing Sheets

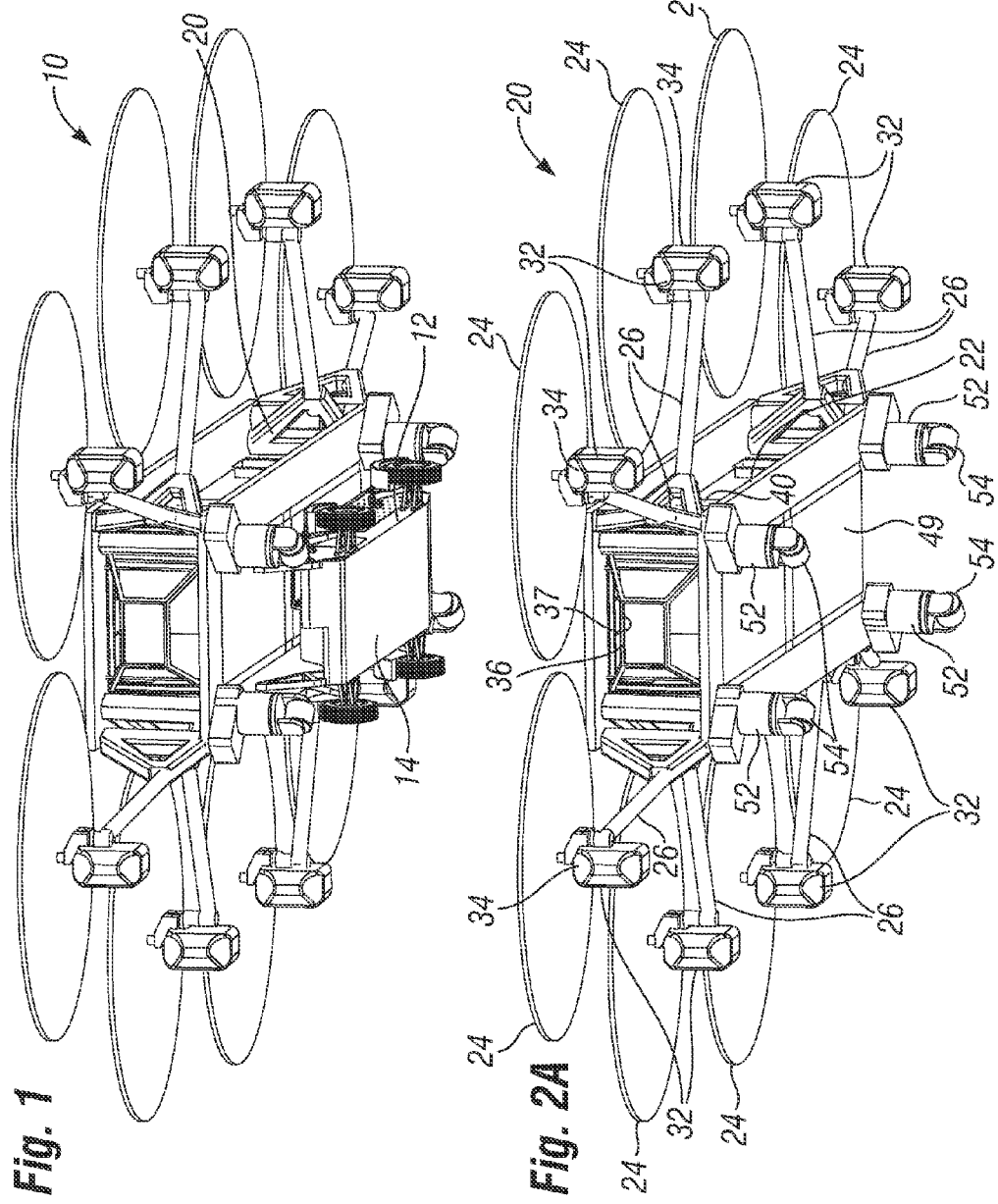

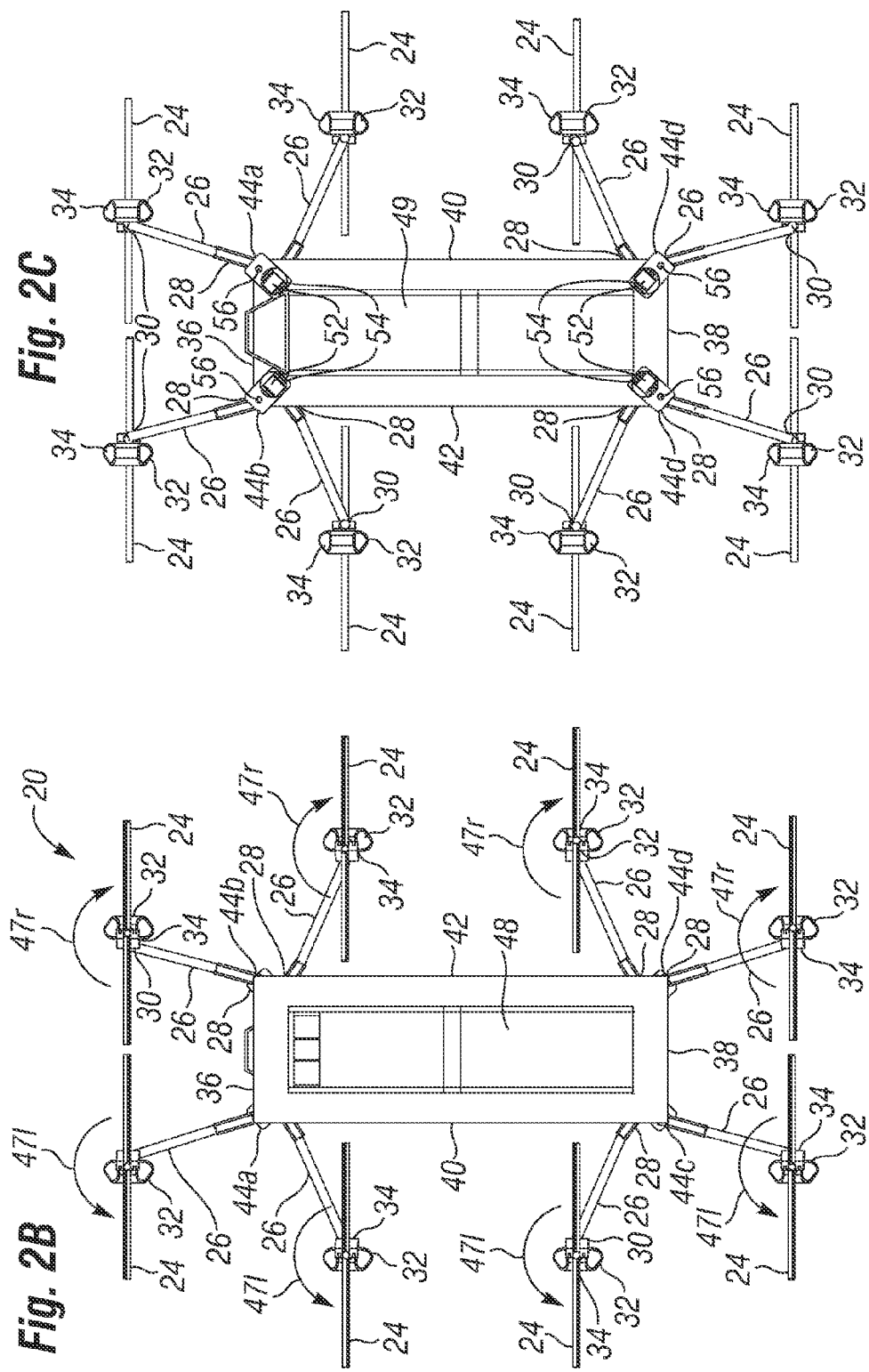

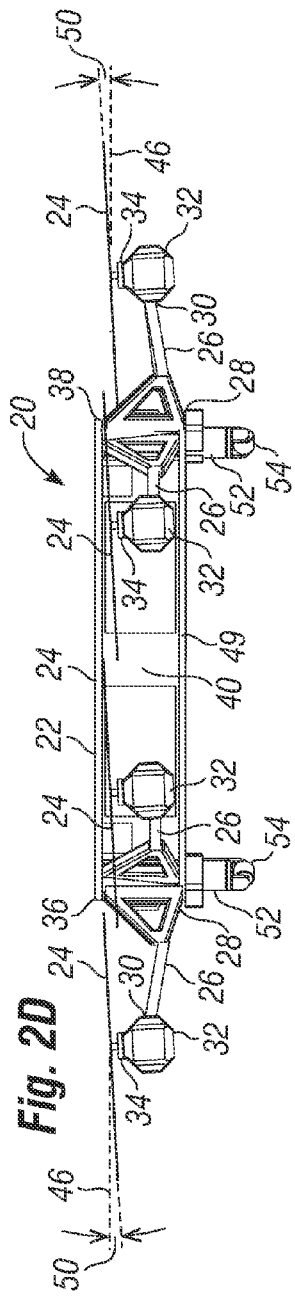
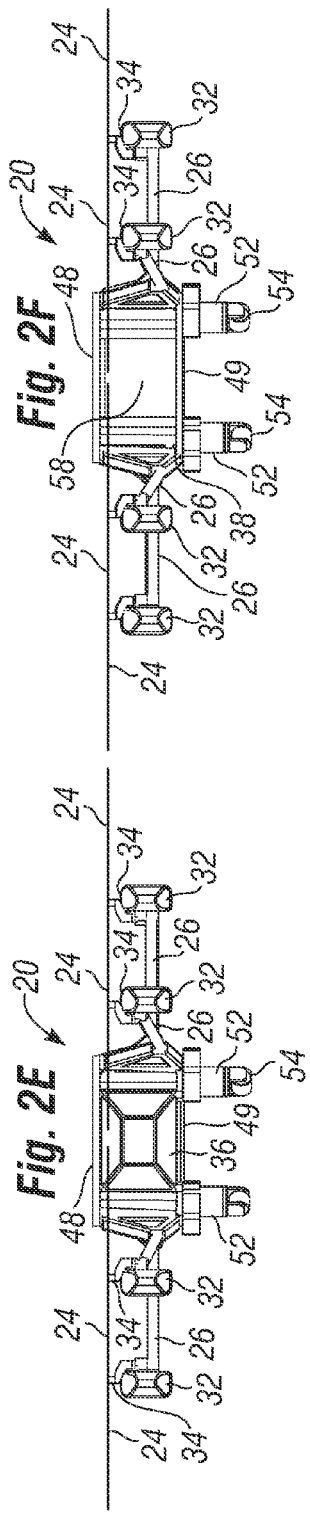
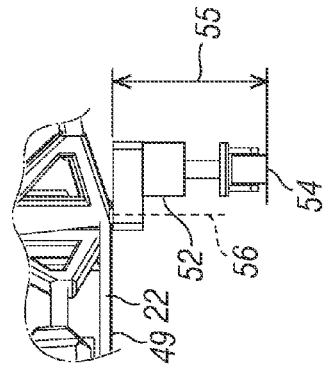
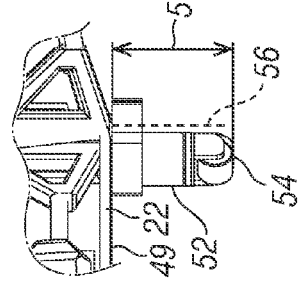
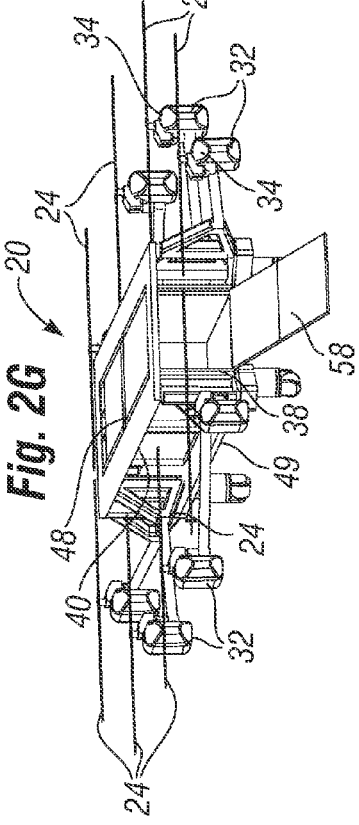

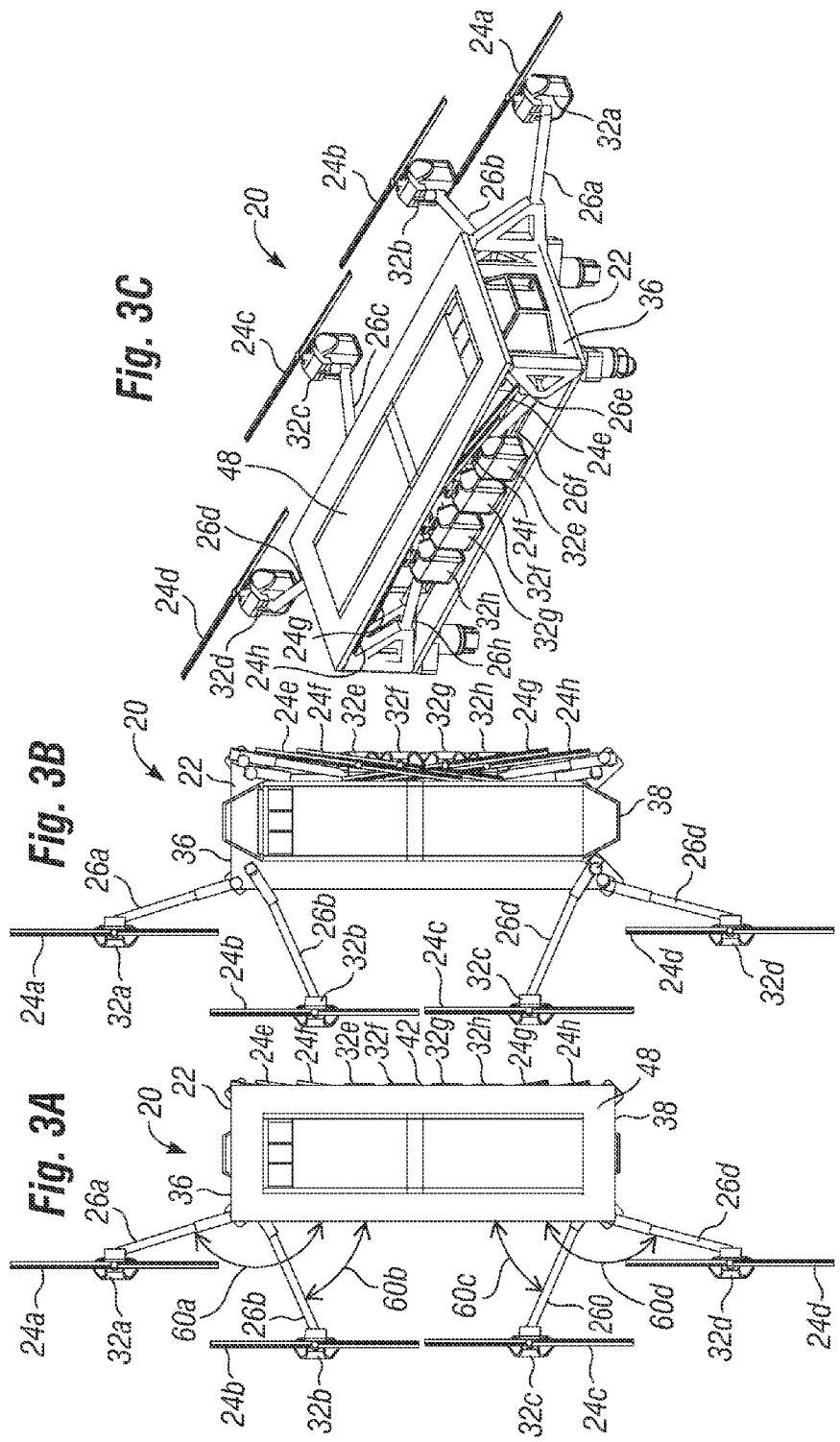

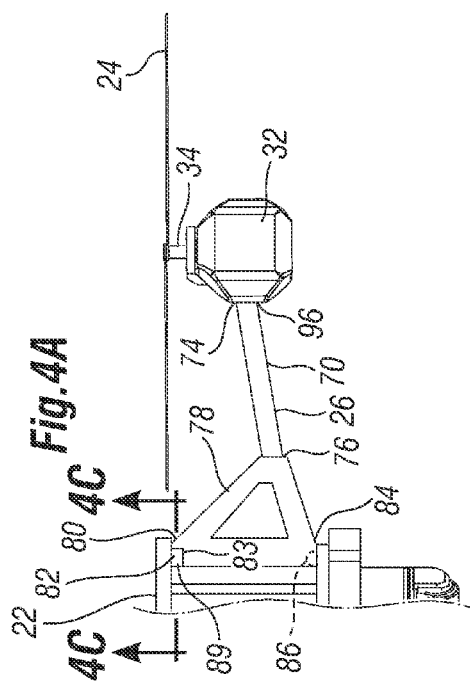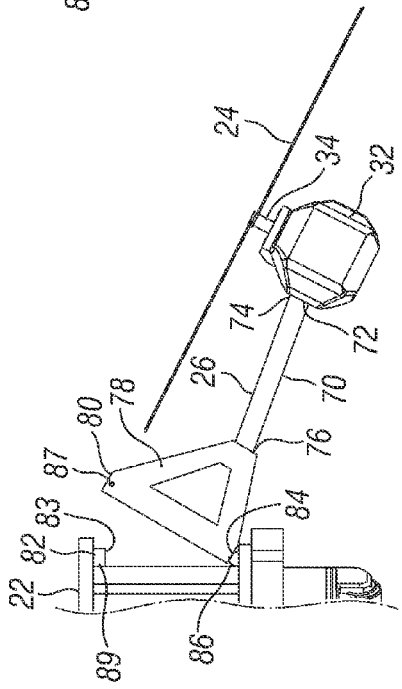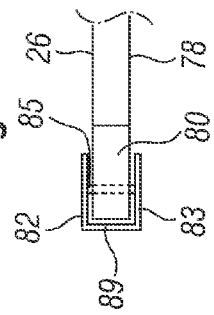

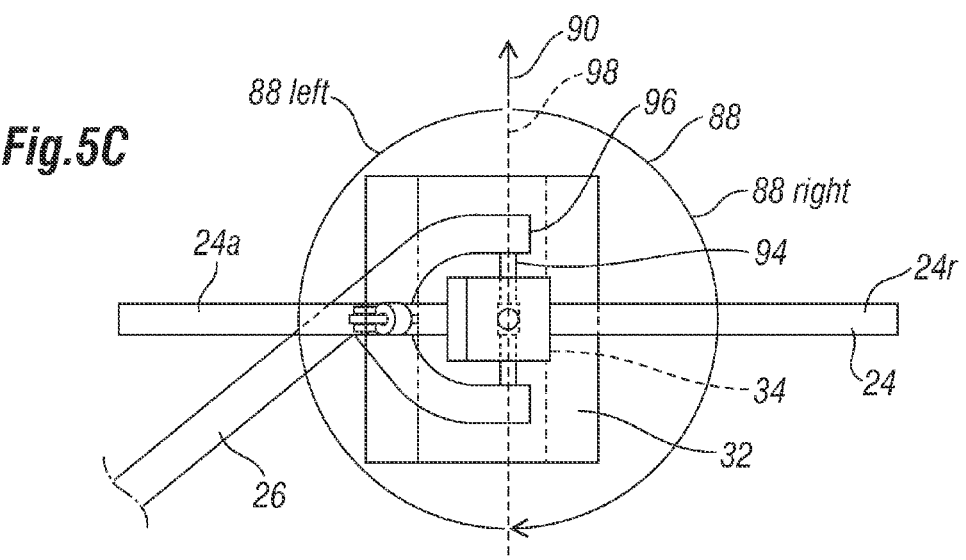
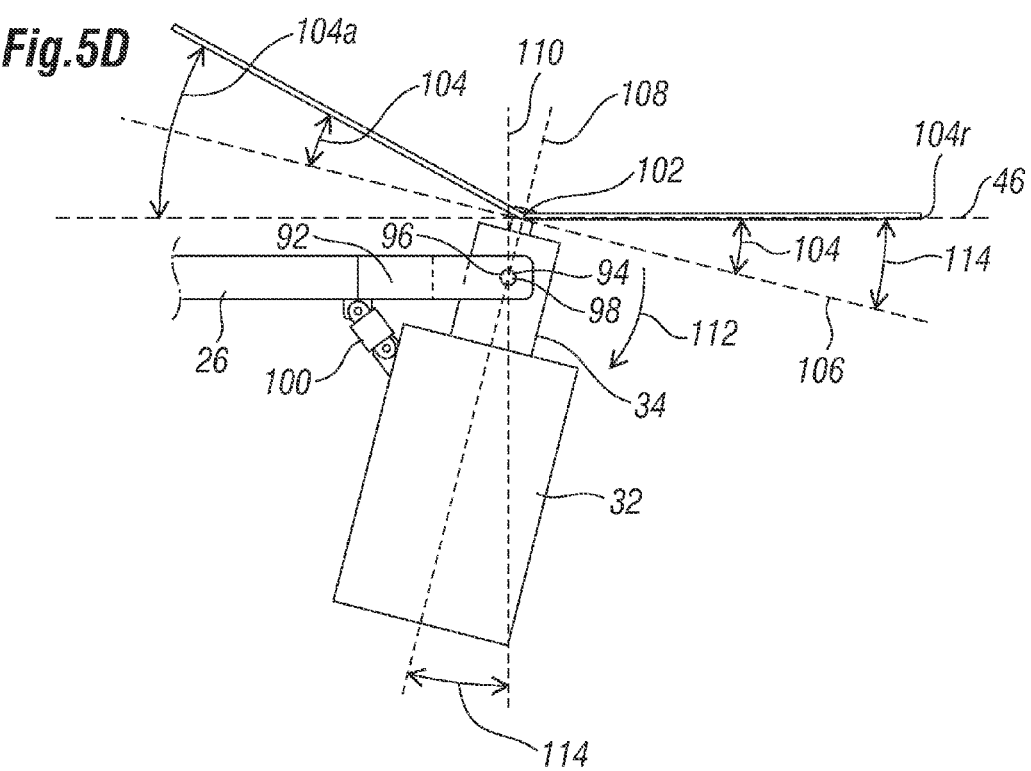

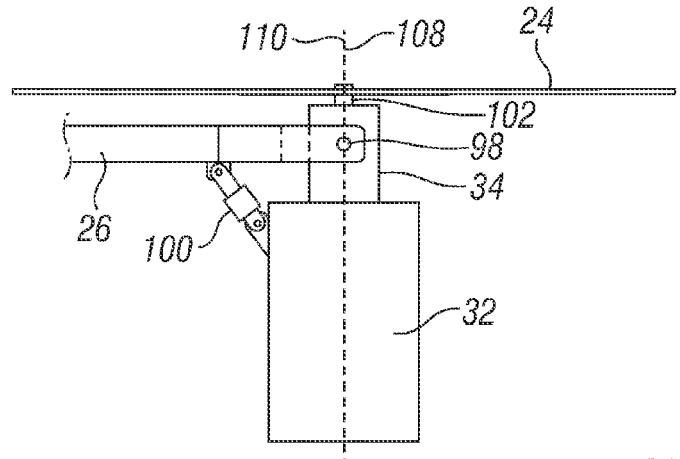
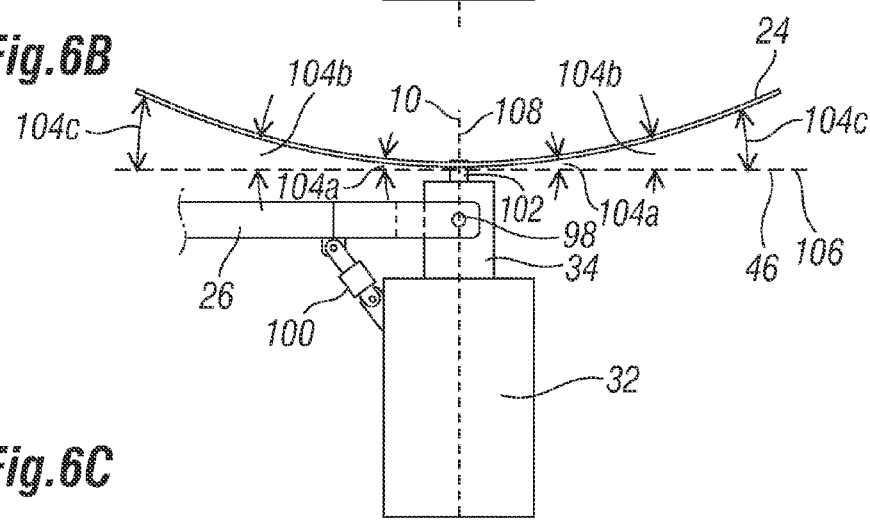
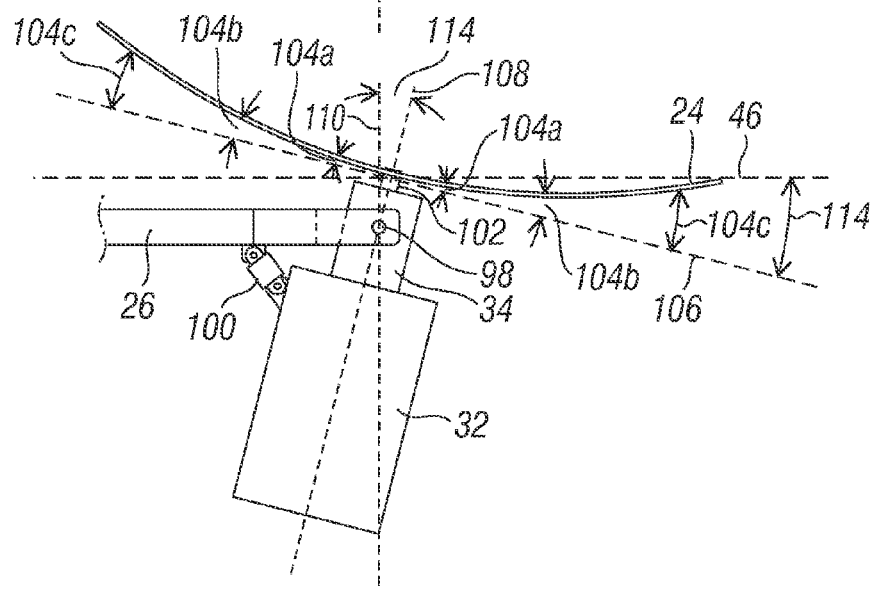

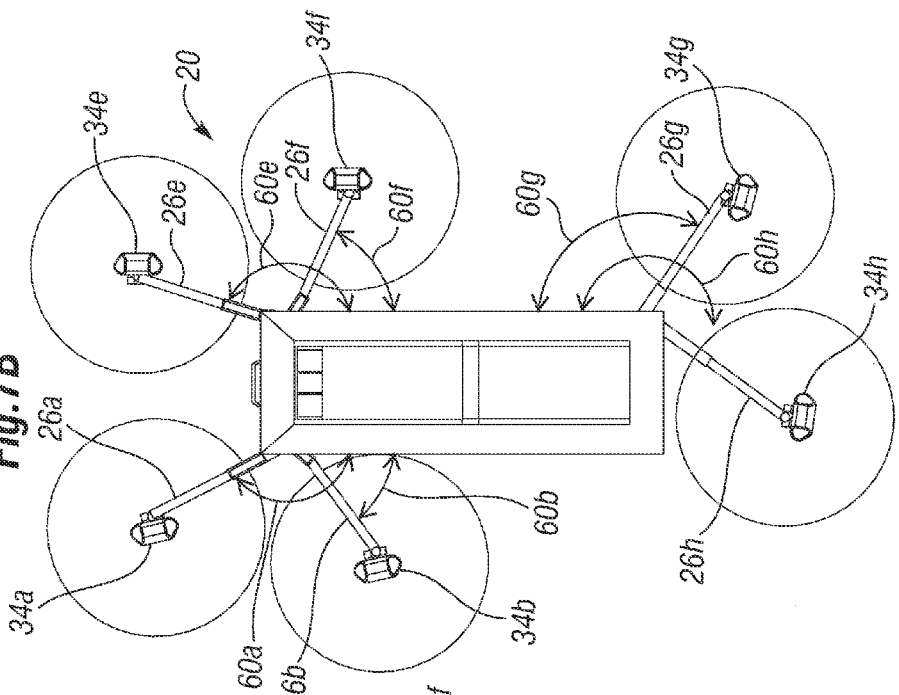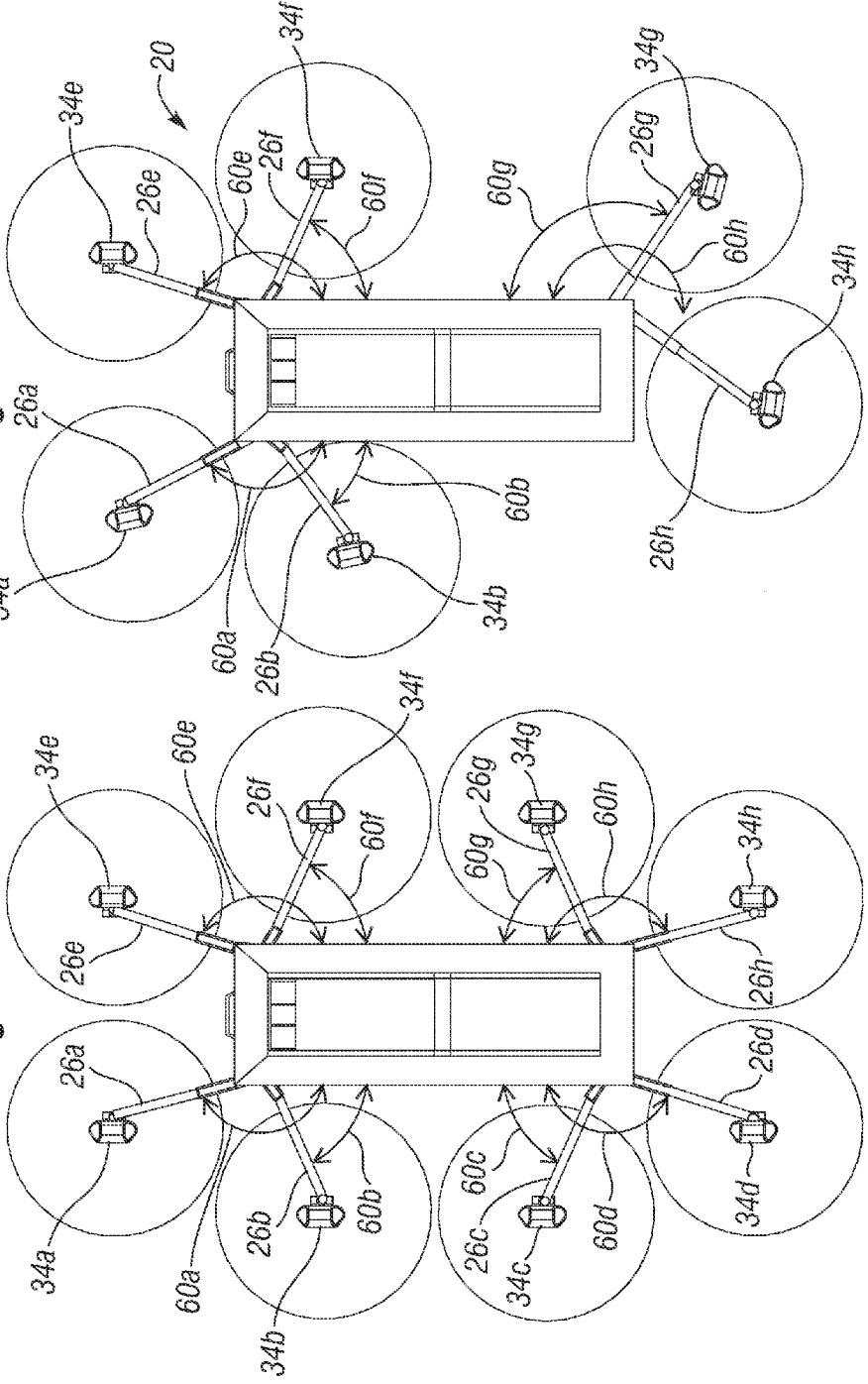

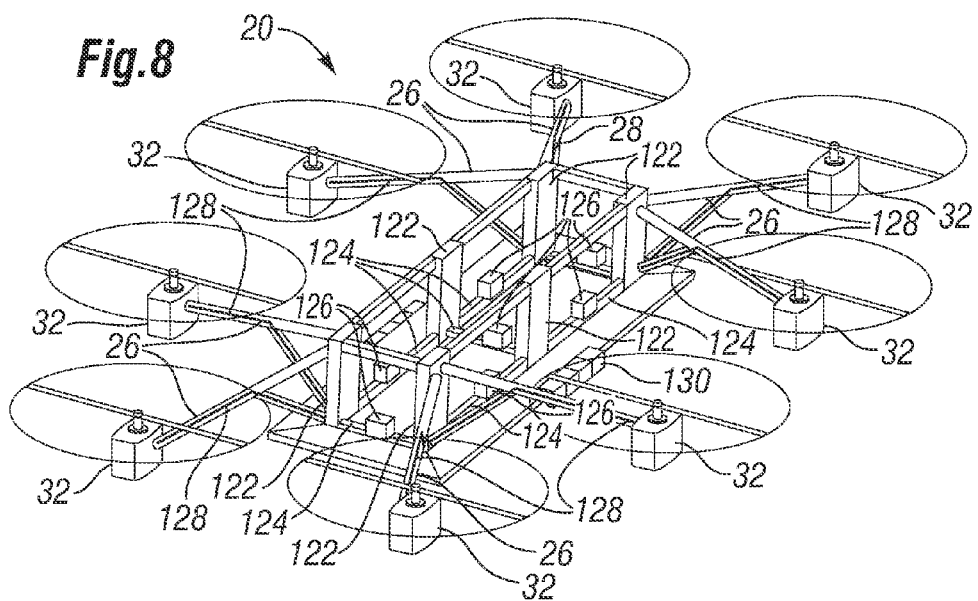
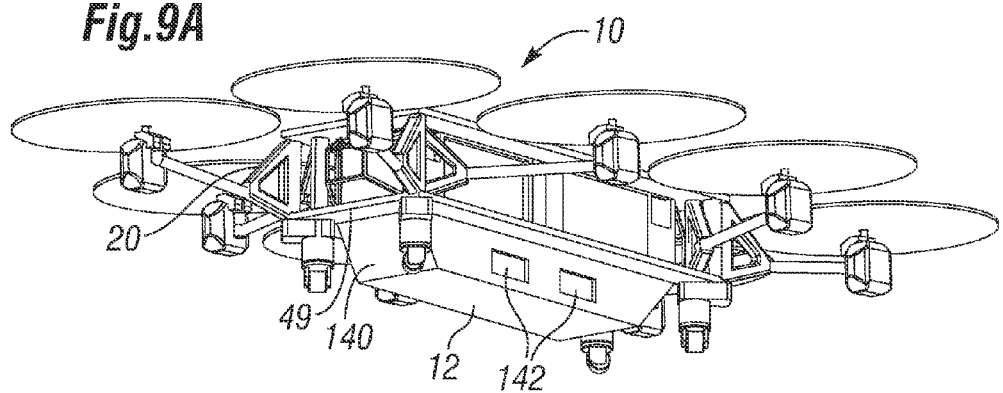
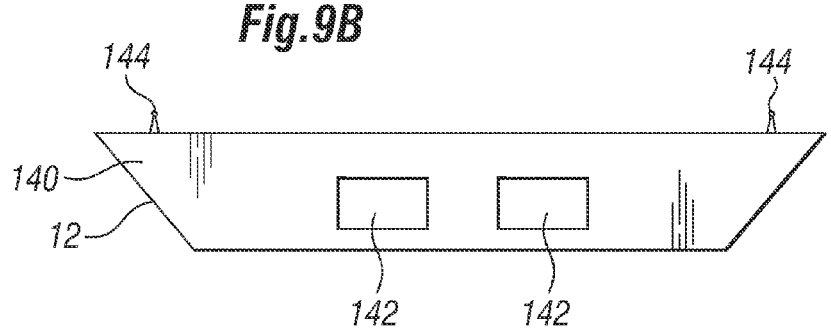

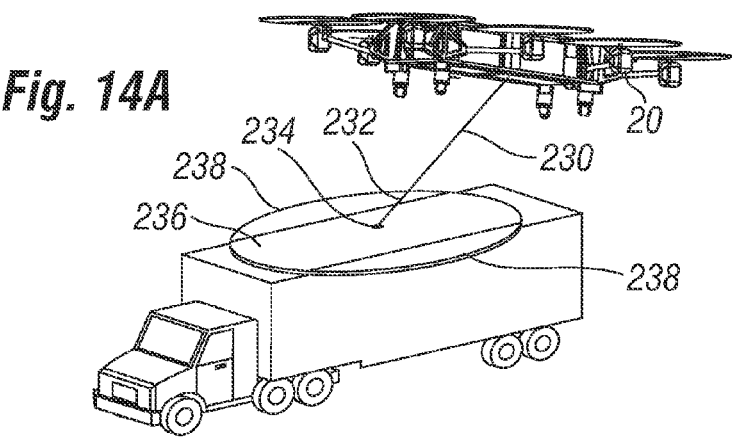
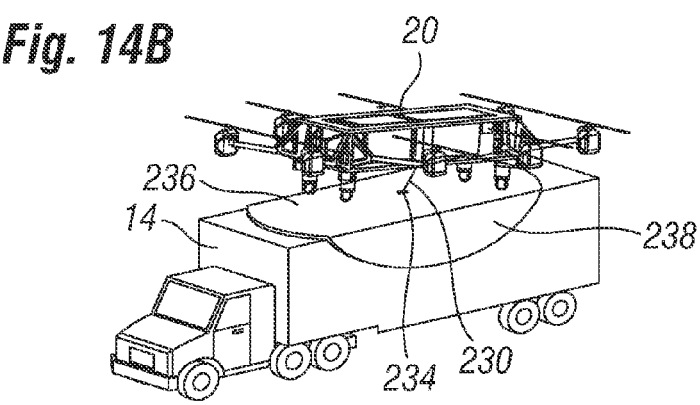
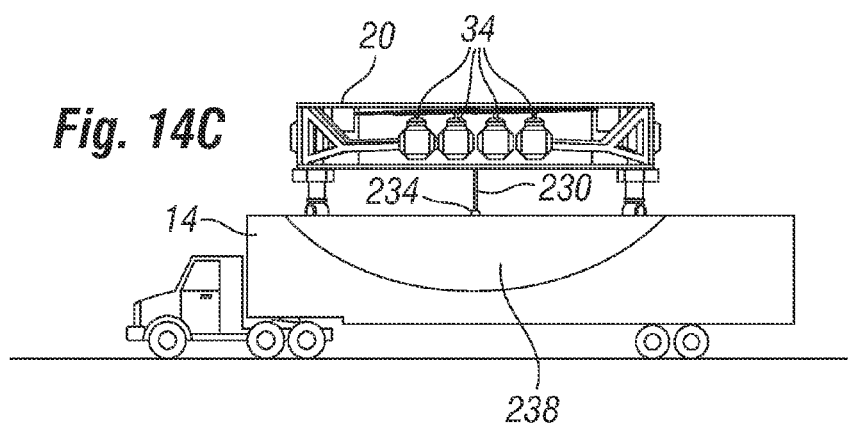

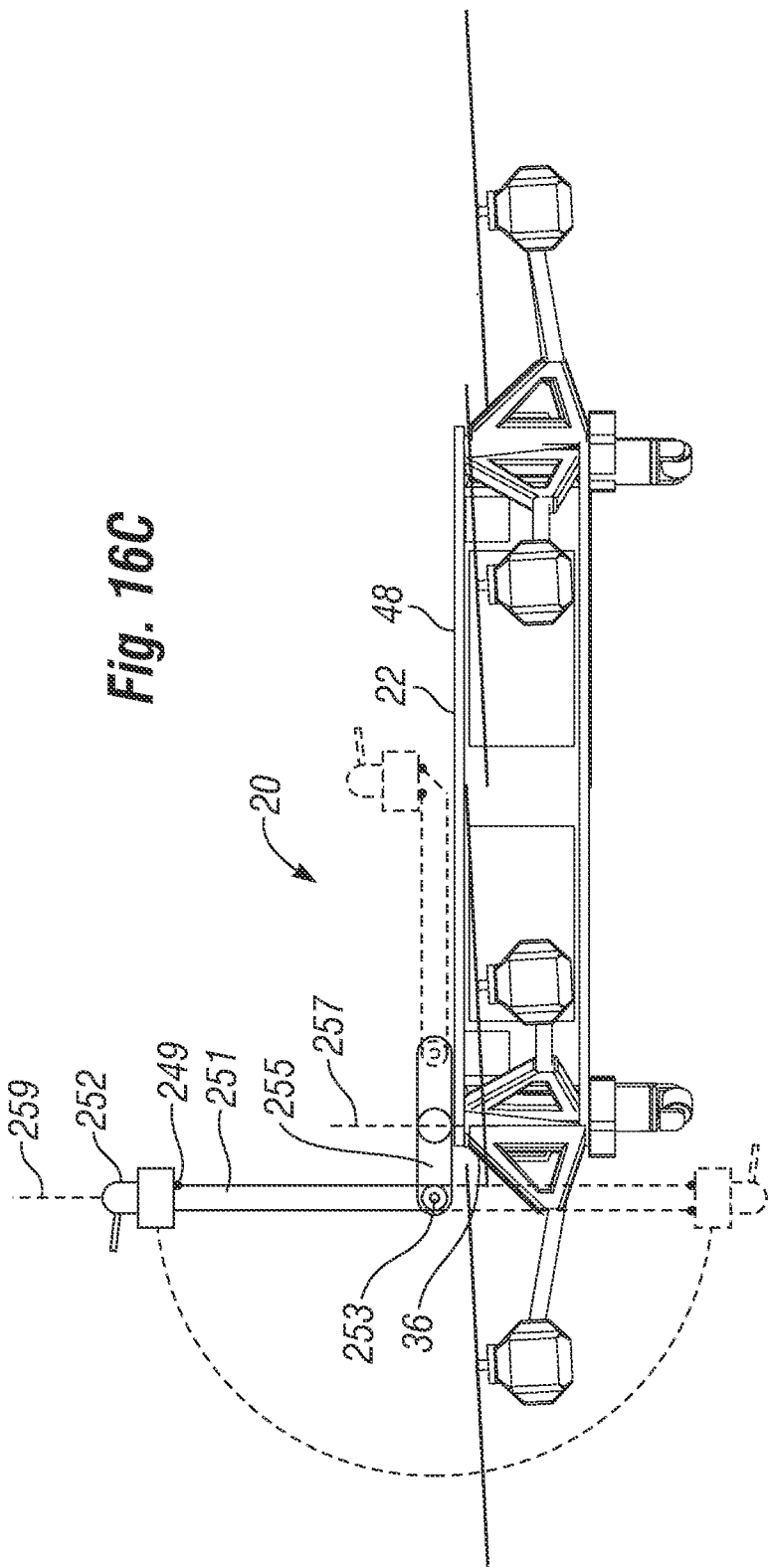

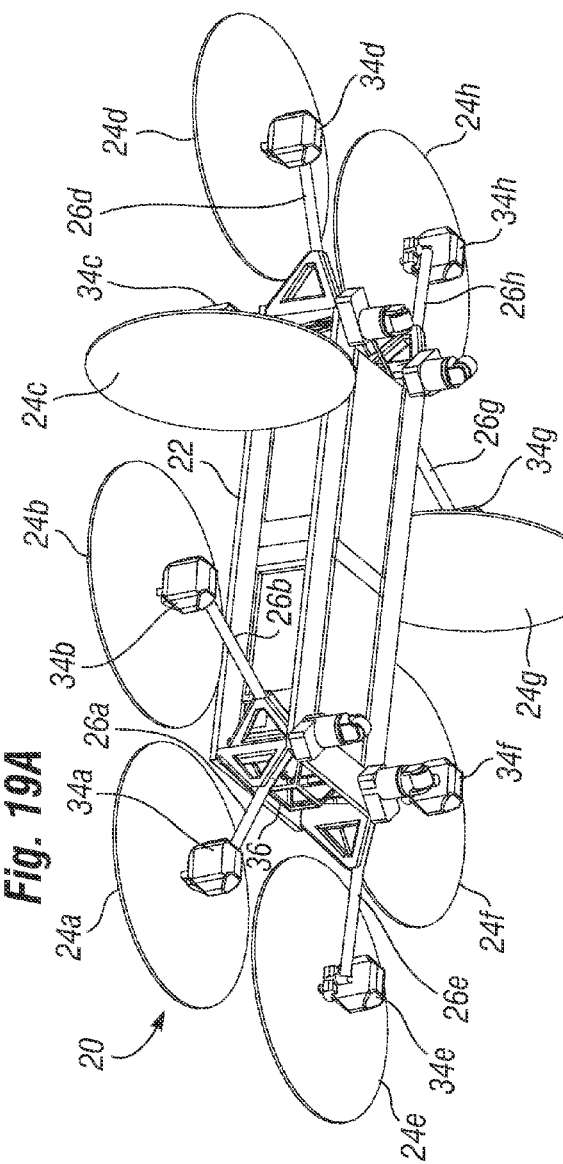
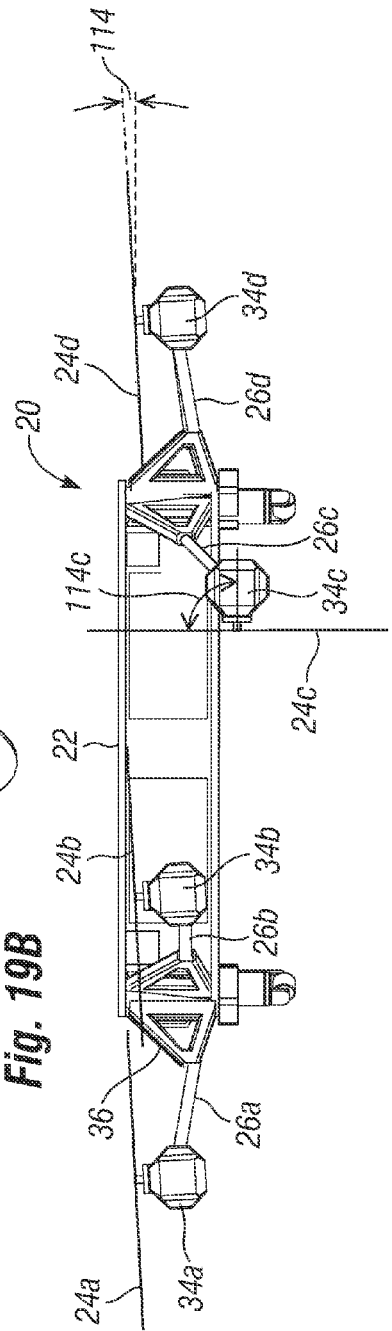

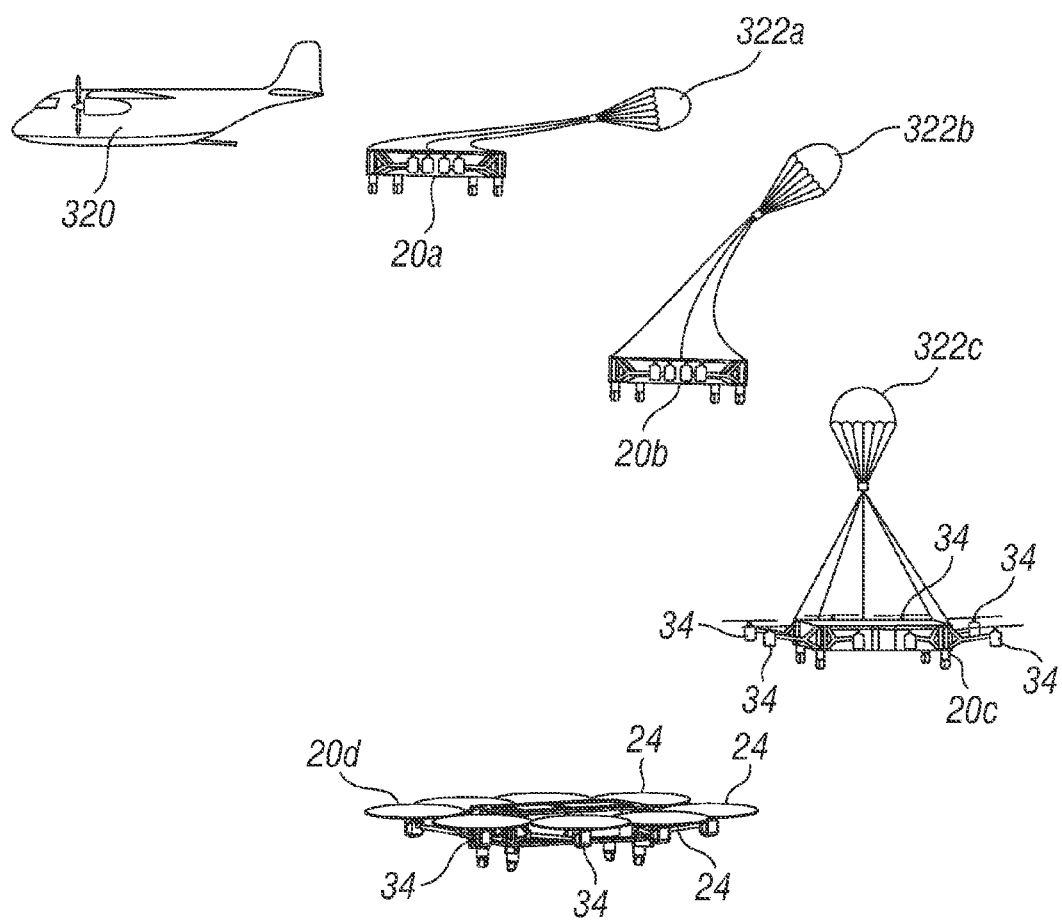

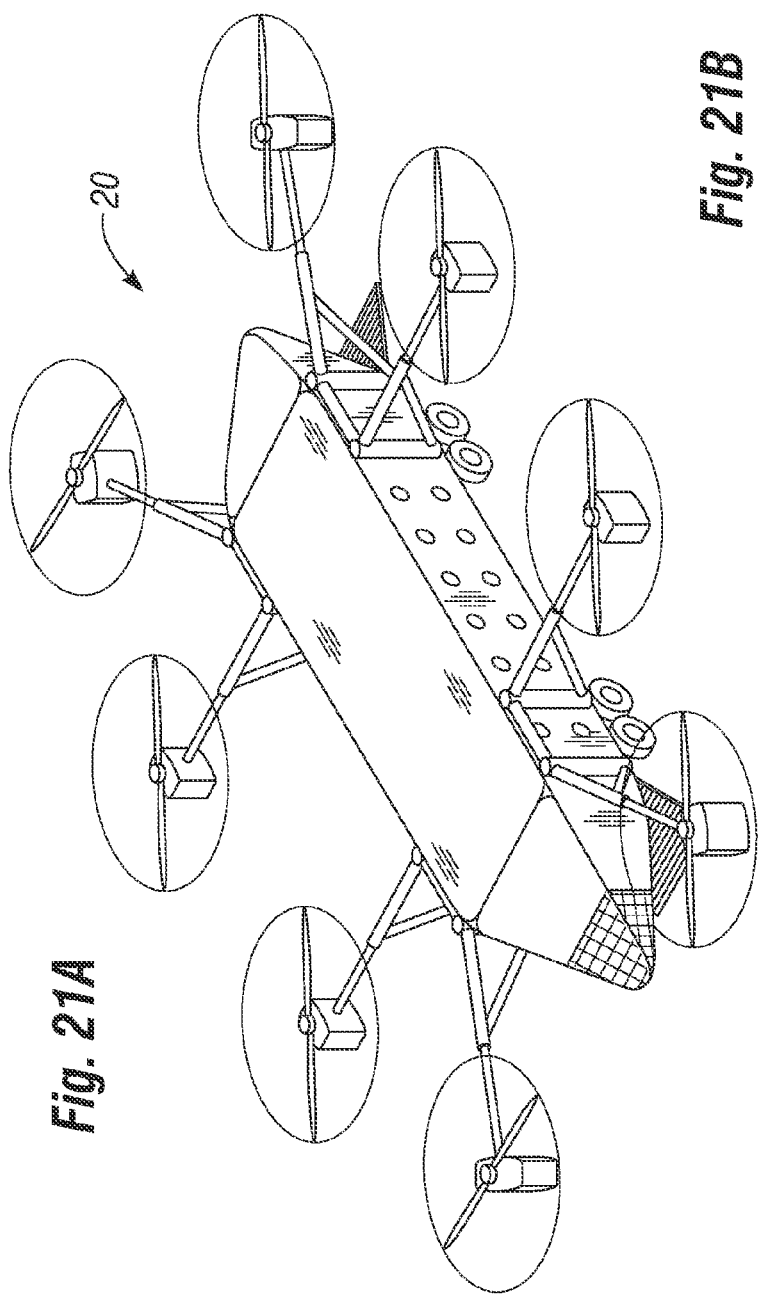
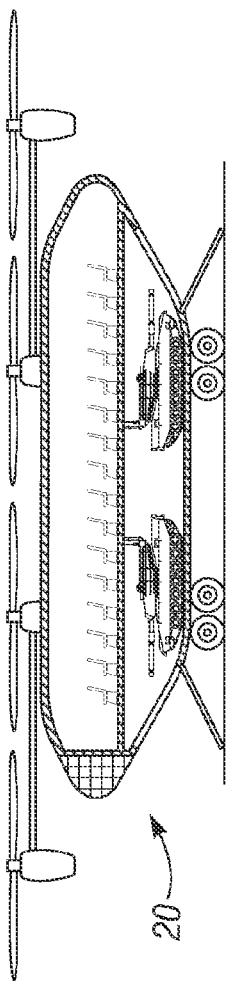
Fig. 21A
Fig. 21B

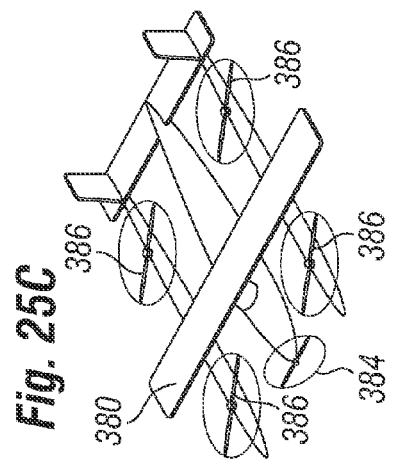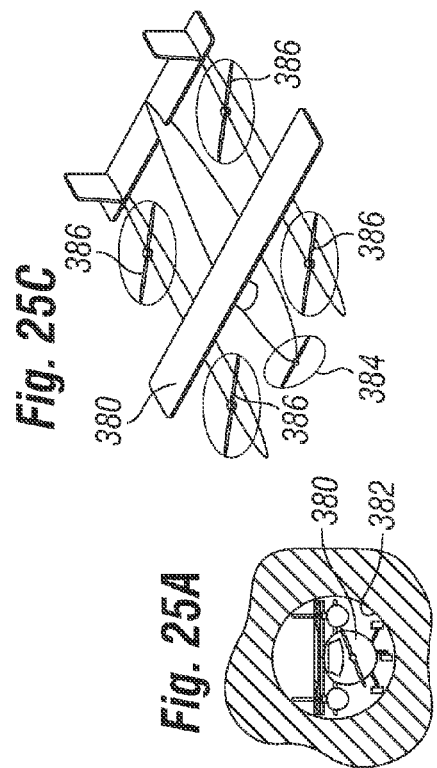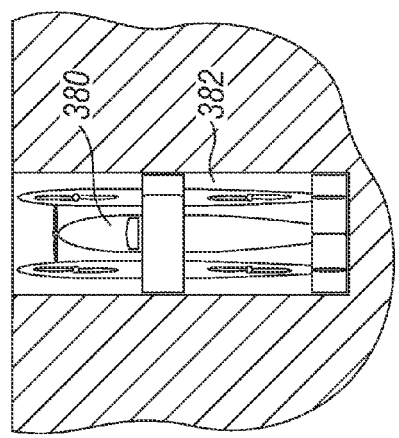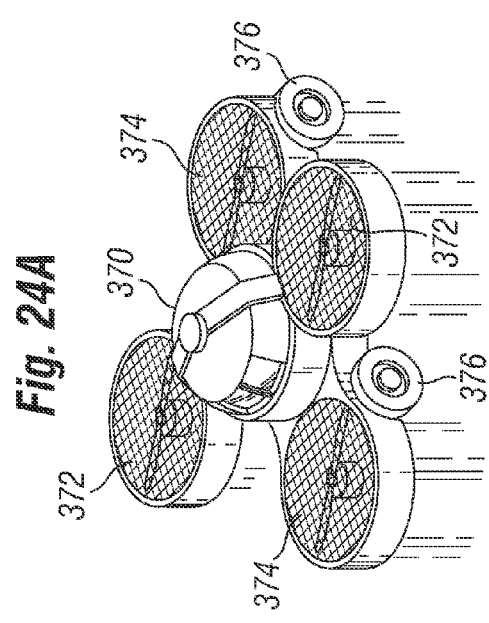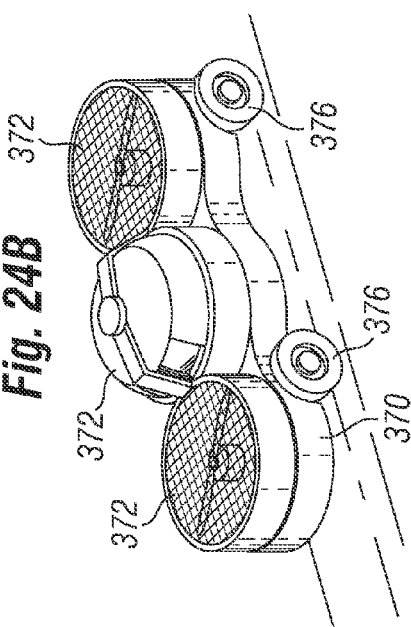

MODULAR FLYING VEHICLE

RELATED APPLICATIONS

The present application is a divisional of U.S. Utility application Ser. No. 12/070,669, filed on Feb. 19, 2008, which claims priority under 35 U.S.C. §119(e) to U.S. Provisional Application No. 60/901,809 filed on Feb. 16, 2007, the entire contents of each of which are hereby incorporated herein by reference.

FIELD OF THE INVENTION

The present invention relates to flight vehicles, and more particularly to flight vehicles configured to carry various payloads.

BACKGROUND OF THE INVENTION

Heavier-than-air flight vehicles have been known for that last 100 years or so, and include airplanes and helicopters. Such flight vehicles are used in many applications where speed is necessary to transport people and/or cargo to distant locations.

In many applications, it is desirable to transport people and/or materials to distant locations where the terrain is rugged and facilities may be lacking. For example, in many military applications troops and equipment must be delivered rapidly to intercept enemy troops. The use of flight vehicles is often the quickest method to transport such troops and equipment.

While airplanes have excellent lifting capacity and altitude capabilities, most airplanes lack vertical takeoff or landing (VTOL) or even short takeoff or landing (STOL) capabilities, and they typically require a large open space for takeoff and landing. In many rugged landing sites, airplanes are not suitable.

Helicopters can land and take off vertically, and have exceptional maneuverability. Helicopters are sometimes subject to accidents and failures, such as engine or rotor failures, which in some situations will lead to a failure and loss of the helicopter. Helicopters also use rotors (as opposed to propellers), which involve swash plates and other complicated mechanisms. Additionally, many helicopters have difficulty operating at high altitudes.

What has been needed is a vehicle that can be easily delivered and deployed for flight, with heavy lift and excellent flight characteristics even at high altitudes, that is adaptable to many uses. The current invention meets those needs.

SUMMARY OF THE INVENTION

The invention is a modular vehicle including an air vehicle and one or more payloads, such as ground vehicles, cargo containers, etc. The vehicle may be able to fly, set down and drive on land, and/or set down and cruise on or in water white also having vertical takeoff and landing (VTOL) or short takeoff and landing capabilities (STOL).

Embodiments of the present invention include a flight vehicle having a main airframe defining an airframe plane, a plurality of propellers extending on supports from the main airframe, with at least one propeller of the first propeller subset of the plurality of the propellers having a forward tilt angle from the airframe plane with respect to the airframe front of about −15 to 15 degrees, or about zero degrees, and with a second propeller subset including at least one propeller having a forward tilt angle from the airframe plane of between 60 and 95 degrees, or about 90 degrees. One or more propellers of the second propeller subset may be configured to be tilted forward from a zero tilt angle to a 90 degree tilt angle. One or more of the propellers may be configured to vary in height relative to the airframe.

A flight vehicle can include a propeller/engine assembly held to a support arm by a holder configured to permit the propeller/engine assembly to tilt away from or toward the airframe forward axis. The propeller/engine assembly holder may permit the propeller/engine assembly to tilt away from or toward the airframe longitudinal axis responsive to a moment applied to the propeller/engine assembly by rotation of the propeller, such as may be caused by uneven lifting forces on an advancing vs. retreating propeller blade with respect to the direction of flight. A restraining mechanism, such as shock absorber or active tilt mechanism (such as an electric motor), may be included to oppose, effectuate, or otherwise control the sideways tilt of the propeller engine assembly. A tilta tilt mechanism configured to effectuate tilt the propeller/motor assembly away from or toward the airframe forward axis.

The invention includes a method of operating a flight vehicle having a plurality of propellers and an airframe, involving positioning each of the plurality of propellers with a tilt angle of approximately zero with respect to the airframe plane; providing power to all of the plurality of motors, wherein the power is sufficient to lift the air vehicle off of the ground so the vehicle is airborne; with the vehicle airborne, maintaining or increasing power to a first propeller subset comprising one or more of the plurality of motors; with the vehicle airborne, reducing power to a second propeller subset comprising one or more of the plurality of motors, while simultaneously; with power reduced or eliminated to the second propeller subset, tilting one or more of the propellers of the second propeller subset forward with respect to the airframe front to a tilt angle of between 60 and 95 degrees; and with the one or more of the propellers of the second propeller subset tilted forward with respect to the airframe front to a tilt angle of between 60 and 95 degrees, increasing power to the second propeller subset. After increasing power to the second propeller subset while tilted forward, power may be reduced and even eliminated to one or more propellers of the first propeller subset.

The propellers of the first subset of propellers may be positioned generally adjacent the airframe front and airframe back, and the propellers of the second subset of propellers may be positioned generally between the first subset of propellers and/or between the airframe front and airframe back. The heights of one or more of the propellers, including first and/or second subsets, may be varied, either on the ground or during flight.

The vehicle is configured to be folded into a more compact form for storage and/or transport. The vehicle can be delivered to a desired location via truck, ship, aircraft, etc., and can be deployed quickly for use. In an embodiment of the invention, the propellers are held on propeller supports extending from the airframe. The propeller supports can extend from the airframe at various angles and lengths, and can be configured to swing or otherwise move away from the airframe to a deployed (flight) configuration and back to a stowed (storage) configuration where the propeller supports and associated propellers (potentially including the engines) are stowed against and/or inside the airframe. Vertically standing pivot arms may used for stowing and deploying the propeller supports, which may be a triangular, cantilever, or other type of extension used to support the engines from the airframe center section during flight. Electric motors, possibly including an electric clocking system, may used to properly position the propellers for storage.

The rotating engine support arms can rotate either from actuators or gears etc and even manual means from ground units or personnel. The arms lock with mechanisms either stowed or deployed but a safety feature can also make the arm lift up or out of the way or even have the engine drop off in an emergency which allows for another engine to rotate into that area and counter that asymmetrical thrust.

All or part of the vehicle can drive or fly or float, etc. The vehicle can include different modular components. One component may provide flight capability, while another component may provide driving or maneuverability on the ground or water, etc. The components can fly, drive, or float, etc. either together or as individual pieces One embodiment of a ground vehicle includes a snow-cat type of adaptation including a treaded track and/or skis. Wheels and floats could also be applied to various components of the invention.

An air vehicle according to an embodiment of the invention includes a plurality of propellers extending from a main airframe. The air vehicle has vertical takeoff and landing (VTOL) as well as short takeoff and landing (STOL) capabilities. The air vehicle may have the ability to have its propellers swing into a stowed position that makes a tightly compact vehicle that can fit into an aircraft (such as a military C-5 cargo plane), ship, or other transport vehicle. The air vehicle propellers may be configured to rotate (manually or automatically) or otherwise extend outwardly to a deployed (flight) position, whereby the propellers are in position to lift the air vehicle off the ground for flight.

The propellers of the invention may be ducted fans, shrouded propellers, bladed propellers, or other propeller assemblies. A bladed propeller may include any number of blades, depending on the particular application. The engines can be attached directly to or even be internal of the airframe with a drive to each propeller, or the engines to each propeller can be adjacent to and/or even directly connected to the propeller on the propeller support arms. The propeller can be directly secured to the engine via a rigid and fixed drive shaft without clutch or other similar mechanism, so that the propeller RPMs will be the same as the engine RPMs. The propeller/engine assembly may include a clutch, such that the propeller can remain still while the engine is running (i.e., at idle, etc.). The propellers can be variable-pitch propellers, such as electric variable-pitch propellers for atmospheric density changes, etc.

The propellers (possibly including attached engines and drive shafts) may be configured to cant front-to-back and/or side-to-side in order to either turn the vehicle in the yaw axis, counter asymmetrical thrust in case of an engine out condition, tilt the aircraft in the air so that the main fuselage can remain more level, etc. The propellers may be tilted in or opposite the direction of motion of the vehicle. The propeller support arms can be telescoping to allow for various propeller sized and/or for repositioning of a propeller.

A vehicle according to the invention could be launched in various methods. The vehicle could launch in a STOL or VTOL technique from land or sea, or from platforms (such as buildings, movable platforms, or ships) on land or sea. The vehicle could include a parachute and/or parafoil or similar device secured to the airframe in order to be launched and/or delivered via air dropping (e.g., from a cargo plane such as a military C-5 or C-130). A drogue chute could stabilize the fall, the engines could start to idle as the drogue chute is retrieved via a mechanism, and the engines could then start to apply full power as the drogue chute is retrieved. The vehicle could also be dropped with just a streamer to stabilize the vehicle, and then start the motors once stability is achieved. Even a freefall with no decelerator may work, with the propellers themselves providing stability and slowing the fall of the vehicle until the engines are fully started. The vehicle could also include an emergency parachute or similar device to be deployed in case of an emergency, such as loss of power to all engines. The emergency parachute could be deployed using an explosive device that throws the parachute into a deployed configuration. A so-called ballistic parachute could be used as an emergency parachute.

The vehicle could be configured for delivery or even launch from a torpedo tube. For example, the diameter of a submarine missile tube is between 6' and 7' in diameter and 28 feet long, and a version of this vehicle can fit in the missile tube and fold away safely for special missions.

The air vehicle may be configured with interchangeable components, including engines, propellers, and corresponding supports. This allows different components to be exchanged in a relatively rapid fashion for repairs and/or different performance requirements. For example, a set of short propellers could be used for applications where rapid acceleration and high speed were desired for the air vehicle, with a set of longer propellers replacing the shorter propellers for use in applications where high lift and high altitude performance are desired for the air vehicle.

Large multi-engine versions can be made, with each propeller driven by not just one but several engines. The added engines not only allow for additional thrust but can also provide redundancy in case of engine loss/failure. The engines can be diesel, (including turbodiesel), electric, hybrid, hydrogen, and other fuel burning motors that turn the propellers sufficiently to propel the aircraft with the payload through the air with good performance.

The air vehicle could be configured to connect with and lift a portable medical treatment facility, such as the LSTAT used by the US Army which is an enlarged medical litter that is essentially a small ICU configured to hold not just a patient but also medical equipment and medical personnel. Such a portable medical treatment facility could fit inside and/or be secured underneath (or to another portion of) an air vehicle of the invention. The air vehicle could be configured to accommodate the medical personnel inside the cockpit of the air vehicle, but still provide access to and from the portable medical treatment facility from the cockpit.

The vehicle may include lifting assemblies for lifting items from the ground/water/etc. up to and airborne vehicle. In one such embodiment, a litter or net-like device is used to lift items up to the vehicle. The net may have a relatively rigid frame or be more sling-like, depending on the particular application.

The vehicle can include external payloads in various forms. External drop tanks configured to carry fuel for the air vehicle (or for delivery to offsite location). Reserve fuel tanks can be located just above the drop fuel tanks for emergency flight if any of the engines quit or is damaged during the flight. Quick fuel dumps can also be done without losing the fuel tanks. The reserve tank would still contain enough fuel to fly to a safe location for landing. The drop takes are below the reserve tanks since they may have to drop during flight. They can be located almost anywhere on the vehicle including by the engines them selves. If the engines are internal to the aircraft then they can be even there. To mate the Flight system to the Ground vehicle it is preferred to place the fuel tanks on the lower sections and out side sections of the vehicle, where the ground wheels will not affect their placement.

The air vehicle can be controlled by an onboard pilot or computer system, or can be remotely controlled via computer and/or remote-located pilot. Traditional helicopter controls can be used in the interior of the vehicle for use by an operator along with the autonomous flight controls. There can be a collective and stick as with existing helicopters to give control of the vehicle to an operator when needed. Note that the air vehicle can be remotely controlled, directly controlled from within the cockpit, or controlled by the autopilot. A satellite link through Iridium and others may be useful.

The air vehicle will typically have advanced electronics and computer controls to maintain stability of the vehicle in flight. Such advanced controls can be of particular importance in controlling and adjusting the power from the large numbers of propellers and engines that may be involved. Many such control systems are already known in the art for use with helicopters and other flight vehicles. Modern aircraft navigation systems can work well with this vehicle. A neural net computer system may be employed. Vehicle stability can be provided by gyros located, e.g., on the centerline between engines that goes through the center of gravity of the vehicle when it is empty. Gyros can be used on a centerline from the empty vehicle center of gravity and even from the full vehicle center of gravity, depending on the need. At least one gyro per axis may be preferred, although at times only one gyro may be used depending on the size and complexity of the vehicle. The gyro stabilization may be at least 70 cycles per second for updates to the throttles to each engine, etc.

Navigation systems can include GPS systems and other modern navigation methods. An autopilot can be used, including many of the helicopter-type state of the art autopilots currently available, such as a Piccolo 2 series autopilot when interfaced with neural net computer software like the one that the Naval Research Laboratory has developed for their SPIDER Helicopter. In addition to other navigation systems, an obstacle avoidance system such as a scanning laser system may be employed to find obstacles in the air vehicle flight path. Difficult-to-spot obstacles such as power lines, etc. may be located using map data, etc. Other aircraft can be avoided through the use of transponder information, by receiving secure data by friendly aircraft as to where they are by GPS coordinates, etc.

Vehicle sizes range from very small (e.g., nanorobot size) to very large. This vehicle can also be a toy that is sold to consumers. The larger versions may be configured to lift very large payloads, including tanks, and also to be driven on highways when on the ground.

Due to issues with currently available vertical lift vehicles, a need exists for a vertical lift vehicle that has improved lift characteristics, reduced cost, and increased reliability. The present invention addresses these needs.

BRIEF DESCRIPTION OF THE DRAWINGS

FIG. 1 is a perspective view of a vehicle according to an embodiment of the invention;

FIGS. 2A, 2B, 2C, 2D, 2E, 2F, and 2G are front perspective, top, bottom, side, front, back, and back perspective views, respectively, of an air vehicle according to an embodiment of the invention;

FIGS. 2H-2I are close-up views of a landing support according to an embodiment of the invention;

FIGS. 3A through 3C are top, top (in cross-section), and perspective views of the air vehicle from FIG. 2A showing various positions of the engines and propellers and support arms;

FIGS. 4A and 4B are side views, respectively, of a propeller support arm assembly according to an embodiment of the invention;

FIG. 4C is a close-up top view, in cross section, of a portion of the propeller support arm assembly of FIG. 4A;

FIGS. 5C and 5D are top and back views of the engine and propeller assembly and support of FIG. 5A in forward flight configuration;

FIGS. 6A-6C are back views of an engine and propeller assembly and support according to a further embodiment of the invention;

FIGS. 7A and 7B are top views of a flight vehicle according to an embodiment of the invention;

FIG. 8 is a perspective view, in partial cross section, of a fuel tank assembly of an air vehicle according to an embodiment of the invention;

FIG. 9A is a perspective view of an air vehicle carrying an external payload;

FIG. 9B is a side view of the external payload from FIG. 9A;

FIGS. 14A-14C are perspective views of an air vehicle tethered with a ground vehicle according to an embodiment of the invention;

FIG. 16C depicts a side view of an air vehicle with gun mount according to a further embodiment of the invention;

FIGS. 19A and 19B are perspective and side views respectively of a flight vehicle in a forward flight configuration according to an embodiment of the invention;

FIG. 20E is a side view depicting an air drop of an air vehicle according to an embodiment of the invention;

FIGS. 21A and 21B are perspective and side views, respectively, of an air vehicle according to an embodiment of the invention;

FIGS. 24A and 24B are perspective views of an air vehicle according to an embodiment of the invention;

FIGS. 25A, 25B, and 25C are front, side, and perspective views, respectively, of an air vehicle according to an embodiment of the invention.

DETAILED DESCRIPTION OF PREFERRED EMBODIMENTS

Figure 5A:
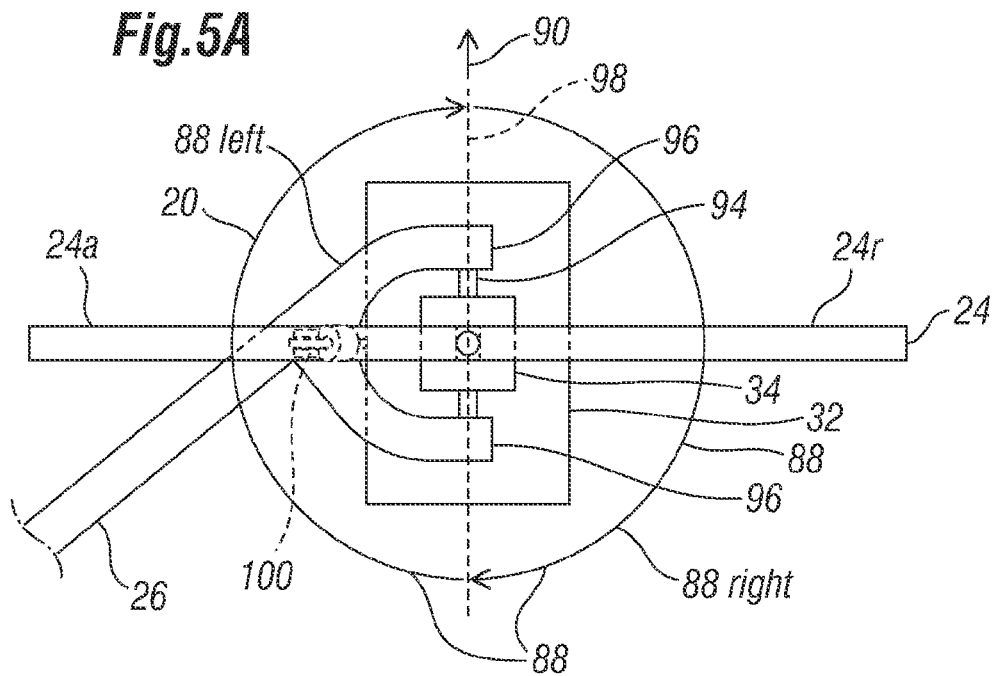
FIGS. 5A and 5B are top and back views respectively of an engine and propeller assembly and support in vertical lift configuration according to an embodiment of the invention.

FIG. 1 depicts a vehicle 10 according the invention. The vehicle 12 includes a transport module 14 in the form of a ground vehicle 16 mated to an air vehicle 20.

FIGS. 2A-2E depict an air vehicle 20 according to an embodiment of the invention, comprising a main airframe 22 having a forward axis 23 passing through its middle in back-to-front fashion. Eight (8) propellers 24 extend from the airframe 22 on propeller supports 26. Each propeller support 26 has a proximal end 28 secured to the main airframe 22, and a distal end 30. In the particular embodiment depicted, each propeller 24 is linked to and individually powered by a devoted engine 32, with a linked propeller 24 and engine 32 forming an engine-propeller assembly 34. One engine-propeller assembly 34 is positioned at the distal end 30 of each propeller support 26. Note that the engine-propeller assemblies for use with the invention may have different configurations, depending on the particular application. In one embodiment, each of the engines 32 provides about 140 or more horsepower, with each engine 32 driving a propeller 24 having an overall length of about 7-9 feet. The propellers 24 may be configured to be easily removed and replaced, either with identical propellers or with different types of propellers, such as propellers which are longer or shorter, etc.

As shown most clearly in the top view of FIG. 2B, the propellers 24 are spaced around the main airframe 22, with four of the propellers 24 extending from the airframe front 36 and four of the propellers 24 extending from the airframe rear 38. Four of the propellers 24 extend from the airframe left side 40, while the other four propellers 24 extend from the airframe right side 42. The propellers 24 and propeller supports 26 extend in pairs from the airframe corners 44a, 44b, 44c, 44d. Different propellers 24 of the air vehicle 20 can rotate in different directions, depending on the particular application and including such variables as the spacing of the propellers, the total number of propellers on a particular air vehicle, and other characteristics of a particular air vehicle, including the engines and propellers thereof. In the particular embodiment of FIG. 2B, the propellers 24 extending from the airframe left side 40 have a rotational direction 47 left in a generally counterclockwise fashion when viewed from above, while the propellers 24 extending from the airframe right side 42 have a rotational direction 47 right in a generally clockwise fashion when viewed from above. With such rotations, the blades of each propeller 24 are in a forward motion with respect to the air vehicle 20 when they are closest to the airframe 22, and are in a backward motion with respect to the air vehicle 20 when they are furthest away from the airframe 22. Note that other rotation patterns are also within the scope of the invention. For example, adjacent propellers may rotate in opposing directions, similar to the egg-beater style opposing rotation of the helicopter blades of a two-propeller Chinook helicopter.

As best seen in the side view of FIG. 2D, the propellers 24 are positioned generally aligned in an air vehicle horizontal plane 46 adjacent the airframe top 48, and are tilted slightly forward from the air vehicle horizontal plane 46 by a forward tilt angle 50, such as a forward tilt angle of zero to 5 degrees, with 3 degrees being appropriate for some applications. The forward tilt angle 50 of each propeller 24 can vary (including variations from propeller to propeller), depending on the particular embodiment. In one embodiment, propellers 24 are generally fixed at a forward tilting angle 50 of about zero to 5 degrees. In another embodiment, the propellers 24 can be selectively rotated in flight (using a mechanical tilting mechanism such as a hydraulic, electric, or other device or assembly) through various tilt angles, including from horizontal to forward by about 90 degrees or even backward by up to about 90 degrees (i.e., a forward tilt angle 50 of −90 degrees). In other embodiment, some of the propellers have very small forward, or even zero, forward tilt angles, while other propellers are tilted forward at much greater angles.

Note that an air vehicle horizontal plane is defined as a plane passing through the air vehicle in a generally horizontal manner with respect to the air vehicle, i.e., horizontal when the air vehicle is on the ground and/or when in a level configuration (e.g., in purely vertical flight mode).

Extending from the bottom 49 of the main airframe 22 are landing supports 52 configured to support the weight of the air vehicle 20 when it is resting on the ground. In the particular embodiment depicted, the landing supports 52 include wheels 54 to permit the air vehicle 20 to be rolled and/or driven on the ground. The wheels 54 may be powered and/or steerable, or may be free moving, depending on the particular application. In other embodiments, the air vehicle 20 may include floats for landing on and/or cruising in a boat-like fashion on water, skis for landing on and/or cruising on snow and/or ice, or other assemblies for landing and/or traveling on various surfaces. The particular landing supports 52 depicted in FIGS. 2A-2H are in their flight position, but are each configured to swing outward about an axis 56 to a landing position, whereby the landing supports 52 extend from the sides of the vehicle, as depicted in the close-up views of FIGS. 2H-2I. The landing supports 52 have a length 55, and in the particular embodiment depicted are configured to extend in length 55 from a shorter retracted (flight) configuration in FIG. 2H to a longer deployed (landing) configuration in FIG. 2I.

The landing supports 52 may have sufficient height 55 when deployed to permit a ground vehicle to be driven under the main airframe 22. The landing supports 52 may be extendable and/or retractable, and may be configured to telescope in length 55 and/or to swing or otherwise extend outward from the main airframe 22. In some embodiments, the landing supports 52 may include hydraulic, electric, and/or other extending mechanisms to extend, retract, and/or otherwise reposition the landing supports 52, and such extending mechanisms may have sufficient lifting capacity to lift the air vehicle 20, when on the ground, from a relatively low height (such as may be desirable to directly load the air vehicle 20, such as through the rear door 48), to a height sufficient for a ground vehicle to be driven thereunder.

Landing supports can also be secured to the engine/propeller supports and/or to the engine/propeller assemblies. For example, engine/propeller assemblies could include wheels, floats, etc. extending beneath them to provide increased stability in situations where an engine/propeller assembly might contact the ground, such as where the air vehicle is landing on uneven terrain and/or water. Such landing supports on the engine/propeller assemblies and/or supports could also facilitate movement of the engine/propeller assemblies and/or supports when detached from the air vehicle, such as where such assemblies are being replaced or repaired.

A cockpit 37 is in the front 36 of the air vehicle 20, from which a pilot can control the air vehicle 20 in flight and on the ground. The cockpit 37 may have a cover/windshield configured to swing outwardly open to act as a door through which the crew can access the vehicle. As depicted in the rear views of FIGS. 2F and 2G, the air vehicle 20 may include a rear door 58, which in the particular embodiment depicted (in a closed configuration in FIG. 2F and an open configuration in FIG. 2G) opens by lowering and forming a ramp for loading materials in the air vehicle 20 through the airframe rear 38.

In the embodiment of FIG. 2A, the propellers 24 are directly powered by engines 32 directly secured thereto by simple drive shafts. However, various engines and engine assemblies can be used with the invention. The engines can be mounted at the end of supports along with propellers, as in the embodiment of FIG. 2A, or the engine or engines can be mounted elsewhere (such as in or on the main airframe) and connected to the propellers via a drive shaft assembly.

The specific engine type and power to be used depends on the particular application, including the air vehicle size, number and size of propellers, desired flight characteristics such as lift and speed, etc. In one version of an air vehicle according to the invention, such as an air vehicle configured for transport in a C-130 cargo airplane, the engines are Meyer nutating, Hirth 2-cycle, or Thielert 4-cycle or similar engines, including engines that burn jet, diesel, heavy fuel, and/or gasoline and can each provide 110 to 150 horsepower. Such engines can be linked to propellers having lengths of 7 feet to 21 feet. Other sizes and configuration are also within the scope of the invention, including very large vehicles with lifting capacities of 100,000 lbs using 4000 horsepower turbine engines driving 80 foot propellers or rotors.

Alternate methods of power are also within the scope of the invention. For example, the propellers could be directly powered by electric motors, with electricity provided by batteries and/or solar cells. Electricity could also be provided by a conventional engine that consumes fuel (e.g., gas, diesel, jet fuel, hydrogen, etc.) and acts as a generator to provide electricity to the electric motors and/or batteries in a so-called "hybrid" arrangement. In a configuration using electric motors, during flight some of the propellers may not need to be powered and the power thereto can be disconnected. Moreover, these unpowered propellers may begin to autorotate, particularly when the vehicle is in forward flight. Such autorotation of a propeller or propellers could cause a corresponding turning of the corresponding electric motor(s), and this turning of the electric motor could be used to act as a generator, thereby generating electricity which could be fed into the batteries and/or into the other electric motors.

In one embodiment of the invention depicted in FIGS. 3A-3C, an air vehicle 20 has propellers 24a-h positioned on supports 26a-h. The propellers 24a-d on the left side 40 of the airframe 22 are depicted in the deployed (i.e., flight) configuration, wherein the supports 26a-d are rotated away from the airframe 22 at angles 60a-d therefrom. The propellers 24e-h on the right side 42 of the airframe 22 are depicted in their stored configuration, with the supports 26e-h folded against the airframe 22 (so that the angles 60e-h are generally equal to about zero) and the propellers 24e-h (which are two-bladed propellers in the particular embodiment depicted) and engines 32e-h aligned snugly against the airframe 22 and to each other.

Note that the number of propellers and associated supports can vary, as well as the attachment points. For example, while FIGS. 2A-2B depict supports secured to the corners of the airframe, other support attachment points are also within the scope of the invention. For example, supports could be secured to a more central portion of the airframe, including in the center of either side. Such support attachment locations could facilitate repositioning of engine/propeller assemblies via variation of the associated angles by which the supports are rotated away from the airframe (such as angles 60a-d from FIG. 3A).

Various supports 26 for the propellers 24 are within the scope of the invention, with FIG. 4A depicting one such embodiment. The support 26 has an arm 70 having a distal end 72 having a support 74 configured to hold an engine/propeller assembly 34, and a proximal end 76 secured to a triangular truss assembly 78. The triangular truss assembly 78 includes an upper portion 80 secured to the main airframe 22 via an upper connection 82 near the airframe top 48, and a lower portion 84 secured to the main airframe 22 via a lower connection 86.

The support 26 and/or engine 32 and/or propeller 24 may be configured to be dropped from the air vehicle 20 in case of an emergency such as loss of engine power (such as due to mechanical failure) or fire on, damage to, or loss of an engine 32 and/or propeller 24 such as may be caused by enemy attack. In one such embodiment, the upper connection 82 is configured with a breakaway mechanism, such as a small explosive configured to sever all or a portion of the upper connection 82, and the lower connection 86 can comprise a ball joint or similar connection. In the particular embodiment of FIGS. 4A-4C, the upper connection 82 comprises a bracket 83 secured to a rod 85 that passes through a hole 87 in the upper portion 80 of the triangular truss 78 of the support 26. In such an embodiment, severing the upper connection 82 permits the entire support 26 (potentially with attached engine 32 and propeller 24) to fall away and outward via gravity and the rotational moment about the ball joint of the lower connection 86, as depicted in FIG. 4B. If the propeller 24 is still generating lift sufficient to lift the support 26 and propeller/engine assembly 34, the inner wall 89 of the bracket 83 will prevent the triangular truss upper portion 80 from being pushed inwardly into the airframe 22

The propeller supports according to various embodiments may be able to extend in length, e.g., in telescopic fashion, during vehicle set-up and/or during flight. The propeller supports can and may be secured to various positions on the airframe, e.g., the center of a side, front, or back (instead of at the corners), etc.

Figure 5B:
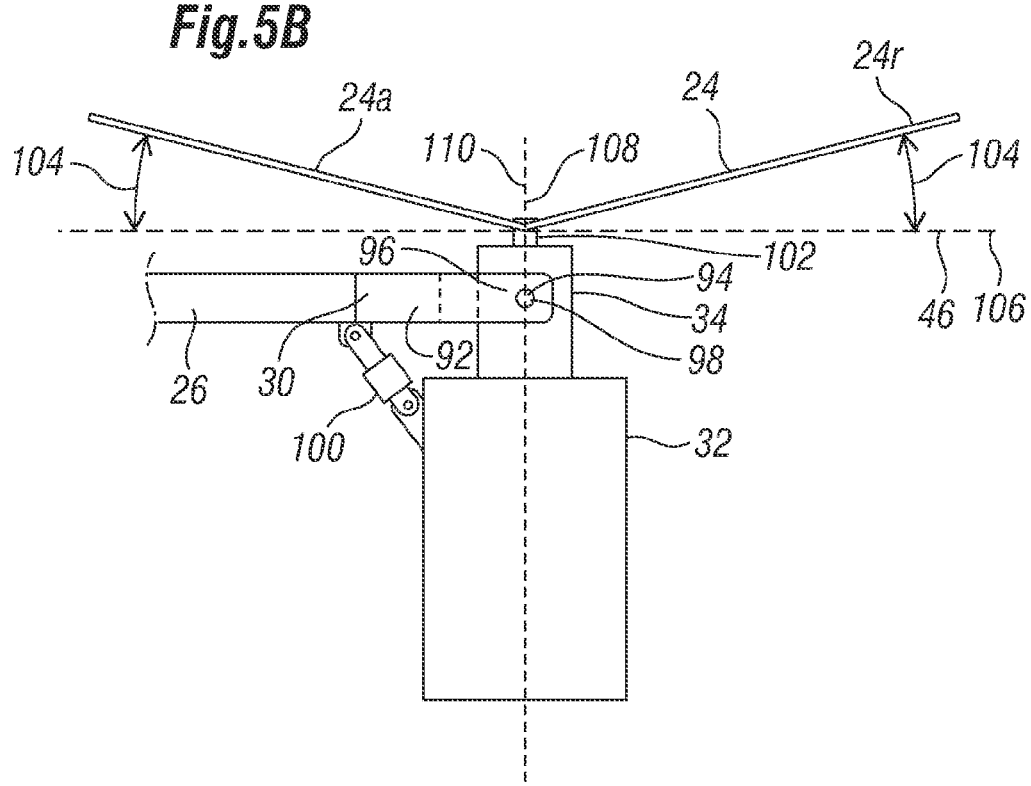

It is known that for lifting propeller blades in helicopters and similar vehicles, when the helicopter is in forward motion the propeller blades create increased lift when in the forward portion of their rotation sweeping forward with respect to the helicopter direction of movement), and create less lift when in the backward portion of their rotation. The resulting unevenness in lift can cause a rotational moment to be created about the forward direction of movement of the air vehicle. To compensate for this unevenness in lift between the advancing and retreating propeller blade, one or more of the propellers 24 of an air vehicle of an embodiment of the invention, potentially including one or more of the complete propeller and engine assemblies 34, may be configured to tilt from one side to another with respect to the direction of flight 90 of the air vehicle 20. FIGS. 5A and 5B depict such a propeller 24 and engine 32, with the propeller and engine assembly 34 and propeller support 16 in vertical lift configuration. In the particular embodiment depicted, the propeller 24 rotates in a clockwise fashion when viewed from above to define a 360 degree rotation 88, so that if this configuration is maintained when the vehicle shifts to forward motion an advancing propeller blade 24a (i.e., for a clockwise rotation the left-hand portion 88 left of its rotation 88 with respect to the flight direction 90, where the blade is advancing with respect to the flight direction 90) will create more lift than a retreating propeller blade 24r (i.e., for a clockwise rotation a blade passing through the right-hand portion 88 right of its rotation 88 with respect to the flight direction 90, where the blade is retreating with respect to the flight direction 90).

In the particular embodiment of FIGS. 5A and 5B, the engine 32 is held at the distal end 30 of the propeller support 26 by a generally U-shaped propeller/engine support 92 having a rod 94 passing between the ends 96 thereof. The rod 92 defines a rotational axis 98 about which the entire propeller/engine assembly 34 can rotate. The rotational axis 98 for the propeller/engine assembly 34 is generally aligned with the flight direction 90 of the air vehicle, except for any forward or backward tilt (such as the propeller tilt angle 50 depicted in FIG. 2D). A rotational controller in the form of a shock absorber 100 extends from the engine 32 to the propeller support 26, and serves to control and limit rotation of the propeller and engine assembly 34 about the rotational axis 98. The rotational controller could also be an active controller, such as a servo actuator that causes and/or prevents rotation of the (propeller/engine assembly 34 subject to commands from a control system.

Note that in the embodiment of FIGS. 5A and 5B, the propeller 24 is positioned above the engine 32, and is directly connected to the engine 32 via a drive shaft 102. The particular propeller 24 has blades each of which are inclined slightly upward at an angle 104 from a plane 106 perpendicular to the drive shaft 102. In purely vertical flight, the drive shaft 102 (which aligns with to the rotational axis 108 of the propeller 24) will typically be a purely vertical axis 110 (i.e., 90 degrees from the horizontal) when viewed from behind the direction of movement as in FIG. 5B, so that the plane 106 will generally be parallel to the air vehicle plane 46.

FIGS. 5C and 5D depict a support 26 and propeller/engine assembly 34 when the air vehicle is in forward flight. The uneven lifting forces on the propeller 24 have created a rotational moment 112 (clockwise when viewed from the rear as in FIG. 5D) about the propeller/engine assembly 34, and the entire propeller/engine assembly 34 has slightly rotated by an assembly rotation angle 114, with the assembly rotation angle 114 controlled and/or limited by a rotation controller such as the shock absorber 100. The assembly rotation angle 114 causes the propeller 24 to tilt slightly toward the right so that the propeller rotational axis 108 is tilted to the right of the vertical axis 110. With this sideways tilt, an advancing propeller blade 24a in the forward sweep of its rotation (88 left in FIG. 5C) is at a relatively large effective angle 104a from the air vehicle plane 46, while a retreating propeller blade 24r in the rearward portion of the rotation (88 right in FIG. 5C) is at a very small effective angle 104b, and may even be generally parallel to, the air vehicle plane 46. The change in angles creates a reduced effective lift area under advancing blade 24a (i.e., on the left side when viewed in FIG. 5D) but increased effective lift area under the retreating blade 24r (i.e., on the right side in FIG. 5D). In purely vertical flight, this unevenness in the propeller blade angles from left to right with respect to the air vehicle plane 46 would create uneven lift, with less lift on the left than the advancing. However, when combined with the uneven lift characteristics created by the forward flight (i.e., advancing vs. retreating blades), the reduction/increase in effective lift area counters the increased/decreased lift caused by the advancing vs. retreating blade, so that the resulting lift pattern is generally equal throughout the blade sweep 88. The combination of forward flight with the uneven tilting of the engine/propeller assembly 34 thus creates generally even lift characteristics, thus reducing stress on the propeller 24, engine 32, drive shaft 102, and other components as well as reducing overall vibration.

FIGS. 5A-5D depicted a propeller 24 having blades with a fixed angle 104 relative to a plane 106 perpendicular to the drive shaft 102. However, due to blade flexibility, a propeller 24 that is flat when not providing lift, as in FIG. 6A, may define a curved shape when rotating and subjected to the lifting forces created thereby, as in FIG. 6B. Such a propeller 24 will define varying angles 104a, 104b, 104c from the plane 106 along its length, with an angle 104a of about zero at portions of the propeller 24 adjacent the drive shaft 102, but the angles 104b, 104c will steadily increase for portions of the blade 24 that are further from the drive shaft 102. However, in purely vertical flight the angles 104a, 104b, 104c will typically be equal from the left side to the right side, as depicted in FIG. 6C. As with a rotational propeller/engine assembly support such as that of FIGS. 5A-5D, a curved propeller will also achieve a generally balanced lift pattern in response to rotation of the propeller and engine assembly, as depicted in FIG. 6C. By tilting the propeller rotational axis 108 to the right (when viewed from behind as in FIG. 6C), the result is increased angles between the advancing blade 24a and the air vehicle plane 46, and decreased angles between the retreating blade 24r and the air vehicle plane. The change in angles creates a reduced effective lift area under advancing blade 24a (i.e., on the left side when viewed in FIG. 6C) but increased effective lift area under the retreating blade 24r (i.e., on the right side). The reduction/increase in effective lift area counters the increased/decreased lift caused by the advancing vs. retreating blade, so that the resulting lift pattern is generally equal throughout the blade sweep.

The forward tilt angle (i.e., angle 50 from FIG. 2D) and/or sideways angle (i.e., angle 114 from FIGS. 5D and 6C) of a propeller 24 can be varied using various techniques. For example, an electric motor, hydraulic system, or other mechanism could be used to tilt the engine/propeller assembly 34 (or just the propeller 24 itself), and/or all or a portion of the propeller support 26. As one example, one or more connections by which a propeller support is secured to the airframe could be moved (i.e., the upper connection moved forward with respect to the airframe, and/or the lower connection moved backward with respect to the airframe) in order to tilt the propeller support and thereby tilt the propeller forward. Reversing these movements could tilt the propeller backward.

In another example, an upper connection could be moved outward while the tower connection could be moved inward, thereby tilting the propeller support outward and thereby tilting the propeller outward. Reversing these movements could tilt the propeller inward. Note that the above connection movements may also be used, either alone or in combination with other devices and/or configuration changes, to raise or lower supports, engines, and/or propellers with respect to the airframe. The propeller support could be secured to the airframe via a bracket, and the bracket could be rotated or otherwise moved (via motors, hydraulics, etc.) to reposition the propeller support and thereby reposition the propeller angle(s) or height, etc.

While two-bladed propellers have been depicted herein, the invention is not limited so such propellers. While two-bladed propellers may have advantages for stowing, manufacture, and/or travel, propellers with any number of blades can be used with the invention. The propellers may be configured to store in different ways. For example, they may fold along one or more sides, front, back, top, or bottom of the vehicle, or be configured for partial or complete disconnect/reconnect from the vehicle for storage/shipping and/or propeller exchange. Propellers may be able to rotate from their deployed (flight) position to the stowed position, and vice-versa, either manually or via electric, hydraulic, mechanical, etc. methods.

The support angles 60a-h of the various propeller supports 26a-h can vary according to the particular application, including the generally air vehicle configuration, number of propellers, load capabilities, etc. In the embodiment depicted in FIG. 7A, in flight configuration the supports 26a, 26d, 26e, and 26h holding the front-most and rear-most engine/propeller assemblies 34a, 34d, 34e, 34h extend at angles 60a, 60d, 60e, and 60h of about 150 to 170 degrees, and the supports 26c-f supporting the central propellers 24c-f extend at somewhat smaller angles 60b-c, 60f-g of about 60 to 80 degrees.

The supports 26a-h may be configured so that the support angles 60a-h can be varied in flight, so that one or more of the supports 26a-h can be angled outward or inward to reposition the corresponding engine/propeller assemblies 34a-h to compensate for center of gravity changes, changes in thrust from various engines, loss of one or more engines, and/or for other reasons necessary to enhance the flight capabilities of the air vehicle 20. In one embodiment, one or more supports 26a-h can change their support angles 60a-h in flight to compensate for different weight balances and centers of gravity, and/or to compensate for loss of one or more engine/propeller assemblies 34a-h (including loss of use thereof). For example, FIG. 7B depicts the flight vehicle of FIG. 7A having lost two engine/propeller assemblies 34c-d, but with other engine/propeller assemblies 34a-b, 34g-h repositioned to compensate for the propeller losses. The supports 26a-b, 26g-h have been changed in their angles 60a-b, 60g-h to reposition engine/propeller assemblies 34a-b, 34g-h, with angles 60a, 60b being decreased and angles 60g, 60h being increased. The new propeller positions compensate for the propeller loss, and further compensation can be provided by adjusting thrust from different propellers, adjusting the center of gravity via methods such as moving fuel from tanks from side-to-side and/or front-to back and/or vice-versa, etc.

In one embodiment, the air vehicle 20 includes an active flight control system that constantly monitors the flight characteristics, including center of gravity, thrust from each propeller 24a-h, power from each engine 32a-h, air vehicle speed and attitude, etc., and automatically adjusts one or more of the propeller forward tilt angles 50a-h, propeller assembly side-to-side angles 114, and/or support angles 60a-60h in order to reposition one or more of the propellers 24a-h to maximize the flight performance, including such factors as lift, fuel efficiency, etc. The flight control system may also adjust propeller position, engine power (and hence propeller thrust), and center of gravity (via fuel movement, etc.) to compensate for various factors such as loss of one or more engines and/or propellers. When the vehicle is ready to lift off, the active flight control system can adjust the RPMs of each engine via throttle controls in order to balance the thrust from the engines with respect to the center of gravity of the vehicle. If the center of gravity is off-center, the air vehicle can compensate by adjusting engine power (thereby adjusting propeller thrust) and also by transferring fuel between different fuel tanks.

FIG. 8 depicts a fuel tank assembly 120 of an air vehicle 20, with multiple fuel tanks 122 positioned in the vehicle. The fuel tanks 122 are generally vertical in shape in order to minimize sloshing of the contents, which could impact center of gravity and otherwise complicate flight characteristics of the air vehicle. Tank-to-tank fuel transfer lines 124 permit rapid and effective fuel between tanks 122 in order to even out the amount of fuel in each tank, balance the center-of-gravity, and/or for other purposes. Fuel transfer pumps 126 control the movement of fuel between fuel tanks 122. Fuel lines 128 lead from the fuel tanks 122 through the supports 26 to the engines 32. Fuel can be fed to the engines via pumps and/or other methods (such as gravity, etc.), depending on the particular embodiment.

The air vehicle 20 may be configured to have fuel drop tanks 130 secured thereto. In the particular embodiment depicted, fuel drop tanks 130 are positioned on either side of the vehicle, generally toward the center of each side and low on the vehicle. The fuel drop tanks 130 provide extra range to the air vehicle 20. The drop tanks 130 are attached via connectors, with drop tank fuel lines configured to transfer fuel from the drop tanks 134 to the onboard fuel tanks 122 and/or directly to the engines 32. Pumps may be used to control such fuel transfer.

The drop tanks 130 may be configured for easy connection and disconnection from the air vehicle 20. For example, quick-connect/disconnect assemblies may be used for quick connection and disconnection of the drop tank fuel lines, and such assemblies may also be configured to be self-sealing. The drop tank connectors 132 may be configured for rapid disconnect during normal operations (e.g., loading and unloading, etc.) and/or for dropping (e.g., via explosives or other rapid disconnect devices) of the drop tanks 130, such as where a drop tank 130 is empty of fuel and it is desirable to drop the drop tank 130. The drop tanks 130 can be dropped in flight or on the ground.

Air vehicles according to the invention may also include fuel lines and connections to transfer fuel between a transport module, such as a ground vehicle, to the air vehicle, or vice versa. The air vehicle will typically include one or more gas fuel openings through which fuel can be added in the traditional manner (e.g., from a traditional gas pump such as found at gas stations). The air vehicle may be configured to automatically transfer fuel to and/or from a transport module when available. The air vehicle may also include in-air refueling devices to permit the air vehicle to be refueled in flight by an airborne tanker airplane or other airborne refueling platform.

FIG. 9A depicts an embodiment of a vehicle 10, where an air vehicle 20 is carrying a transport module 12 in the form of a cargo module 140. The cargo module 140, depicted alone in FIG. 9B, is configured be secured to the underside 49 of the air vehicle 20. The cargo module 140 includes one or more doors 142 through which cargo can be loaded, and includes connectors 144 configured to be mated to corresponding connectors on the air vehicle 20.

Figure 10A:
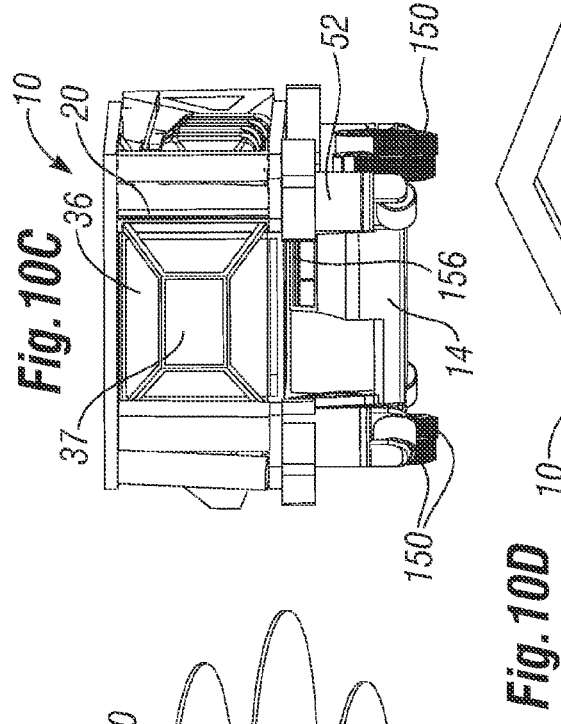
FIG. 10A is a perspective view of an air vehicle carrying a ground vehicle.
Figure 10B:
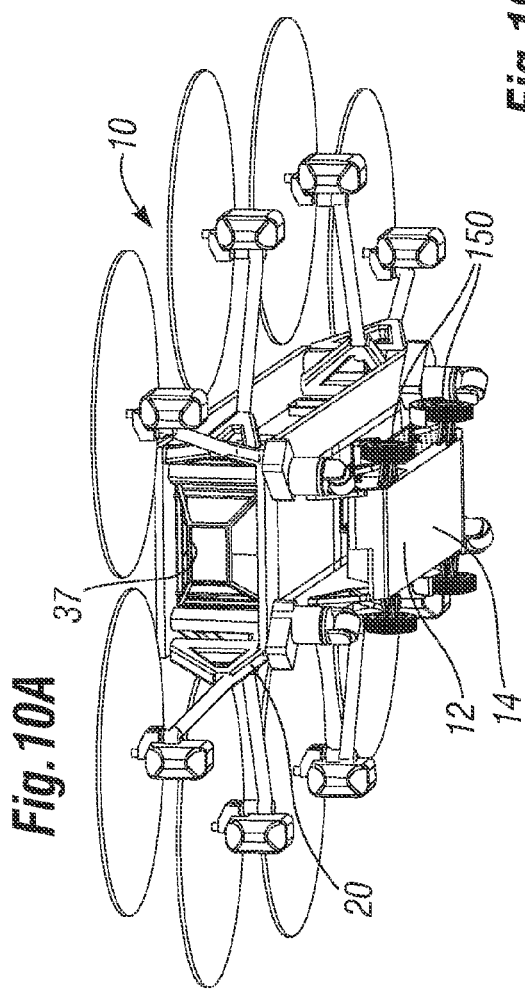
FIG. 10B is a perspective view of the ground vehicle from FIG. 10A.

A vehicle 10 may include a transport module 12 in the form of a ground vehicle 14, such as that depicted in FIGS. 10A-10B. The ground vehicle 14 is configured to drive on land via wheels 150. The ground vehicle 14 includes connectors 152 configured to be mated to corresponding connectors on the air vehicle 20. The particular ground vehicle 14 depicted includes a rear cargo area 154 and a front cockpit 156 from which a driver can control the vehicle, which may be accomplished using traditional ground vehicle controls (e.g., steering wheel, gas pedal, brake, etc.).

Note that in addition to or in lieu of wheels, a ground vehicle 14 or other transport module may include skis, skids, tank-like tracks, and/or other drive devices, depending on the particular application (including the terrain over which the ground vehicle is anticipated to operate). In other embodiments, the vehicle or other transport module may include floats for landing on and/or cruising in a boat-like fashion on water.

Figure 10C:
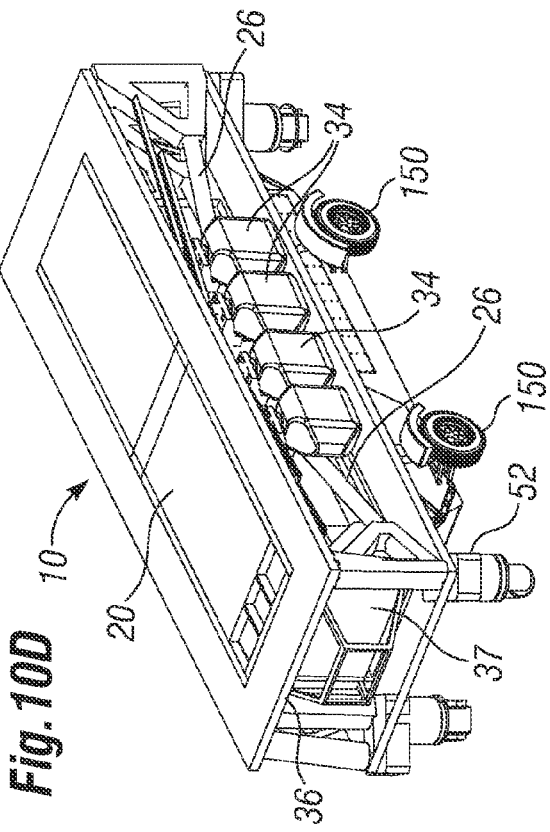
FIGS. 10C and 10D are front and perspective views of a vehicle having a ground vehicle and air vehicle and configured to be driven on the ground.
Figure 10D:
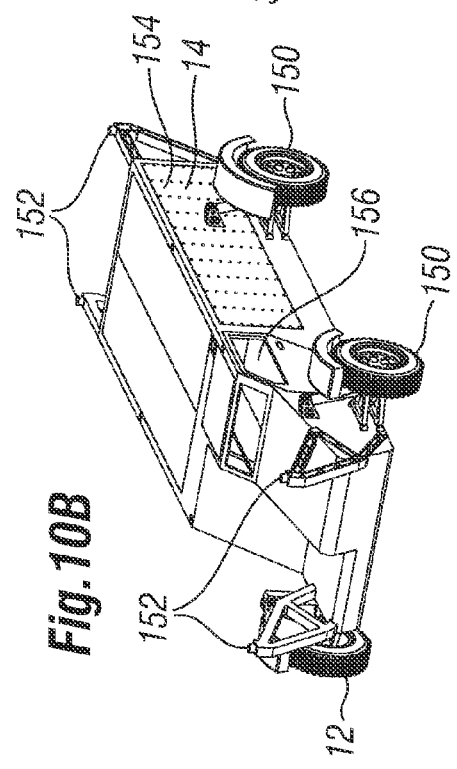

The vehicle 10 when on the ground can be driven using the ground vehicle 14, with the air vehicle 20 secured to the top thereof as depicted in FIGS. 10C-10D. With the vehicle 10 is landed on the ground, the engine/propeller assemblies 34 and struts 26 can be retracted and folded against/inside the air vehicle 20, and the air vehicle supports 52 can be retracted (if not already retracted prior to landing) so that the wheels 150 of the ground vehicle 14 carry the entire weight of the vehicle 10, including the weight of the air vehicle 20 and ground vehicle 14. Controlling the driving of the entire vehicle 10 over the ground can be accomplished via the ground vehicle cockpit 156 or from the air vehicle cockpit 36, with controls in either cockpit 156, 37 configured to control (through direct connections, wireless, etc.) the power to and steering of the ground vehicle wheels 150.

Figure 11A:
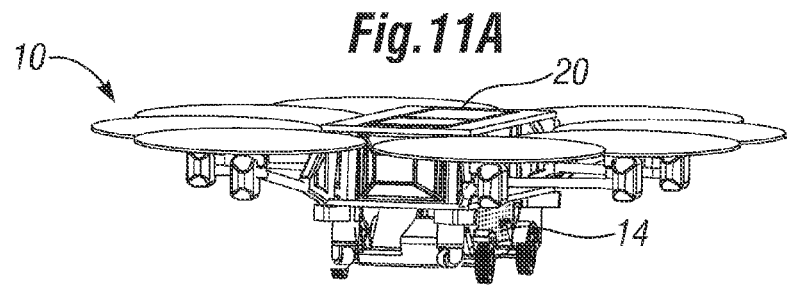
FIGS. 11A-11C are perspective views of an air vehicle lowering a ground vehicle via cables.
Figure 11B:
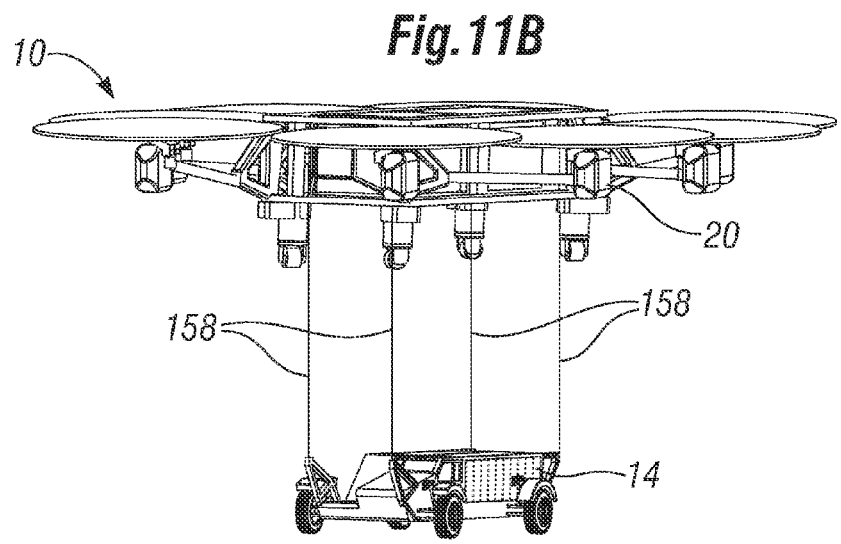
Figure 11C:
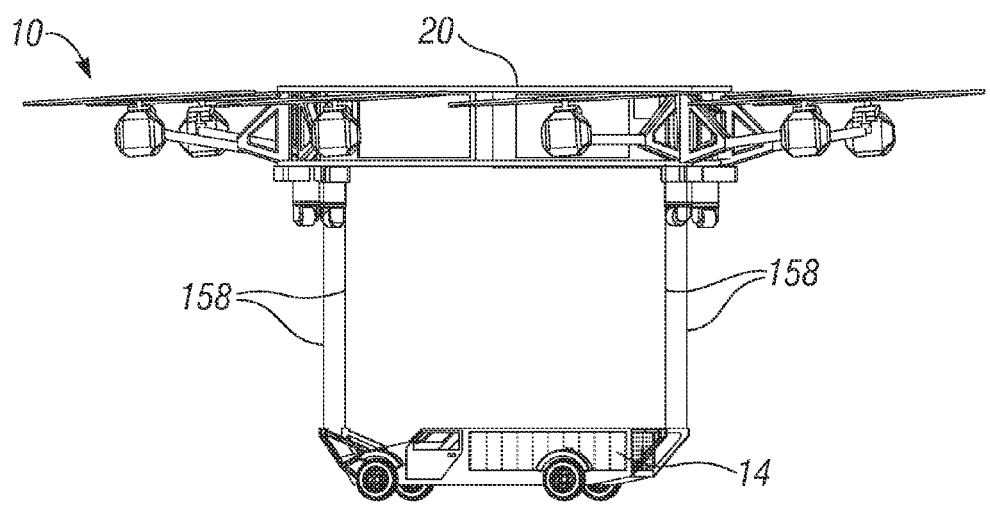

A transport module 12 such as a ground vehicle 14 can deposited onto the ground or other surface by having the air vehicle 20 (with ground vehicle 14 attached) land on the ground or other surface and then release the ground vehicle 14 therefrom. The transport module 12 can similarly be removed from the surface by securing the air vehicle 20 to the transport module 12/ground vehicle 14 when on the ground, and then lifting off the combined vehicle 10 using the air vehicle 20 to directly lift the transport module 12/ground vehicle 14. In another embodiment depicted in FIGS. 11A-11C, a transport module 12 in the form of a ground vehicle 14 is lowered onto the surface from an airborne air vehicle 20 using cables 158 (powered by winches or other reeling devices), so that the air vehicle 20 remains airborne at all times during landing of the ground vehicle 14. The process can be reversed to lift the ground vehicle 14 up to the airborne air vehicle 20, with the cables 158 and winches used to lift the ground vehicle 14. The cables 158 are secured to the corners of the ground vehicle 14 in order to provide better balance when lifting and/or lowering the ground vehicle 14. The cables can also be used to guide the air vehicle 20 to a landing on top of a surface-based transport module 12 such as the ground vehicle 14, wherein one or more of the cables can be winched in to draw the air vehicle 20 down onto the top of the ground vehicle 14.

Figure 12A:
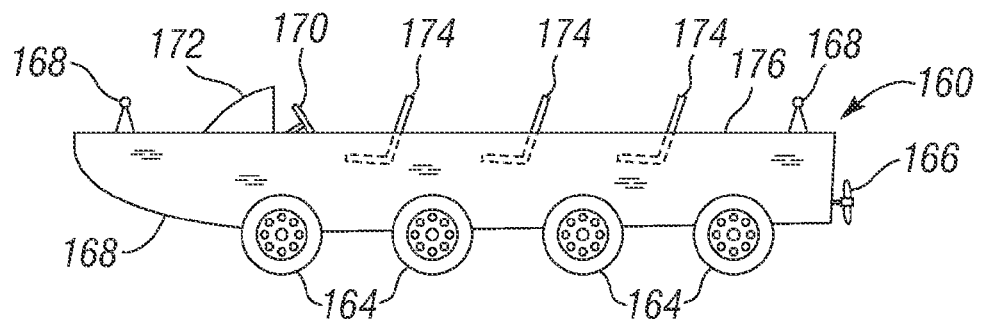
FIGS. 12A-12C are side views of vehicles configured for carrying by an air vehicle according to an embodiment of the invention.

A transport module 12 may be an amphibious vehicle 160 configured for crossing land and water, as depicted in FIG. 12A. The amphibious vehicle 160 includes a generally boat-like hull 162 and has sufficient buoyancy to float in water. A ground drive system in the form of multiple inflated wheels 164 (which also provide buoyancy) is used to drive the amphibious vehicle when on land. A water drive system in the form of one or more propellers 166 provides forward thrust when in water. Note that other types of ground and water drive systems are also within the scope of the invention, including skis, skids, tank-like tracks, water-jet propulsion, rudders, and/or other drive and/or steering devices. The amphibious vehicle 160 includes connectors 168 configured to be mated to corresponding connectors on the air vehicle 20. The amphibious vehicle 160 can include controls, including a steering wheel 170, as well as a windshield 172 and one or more seats 174. All elements that extend above the top 176 of the amphibious vehicle 160 may be configured to fold down below the top in order for the amphibious vehicle 160 to be secured to the air vehicle 20.

Figure 12B:
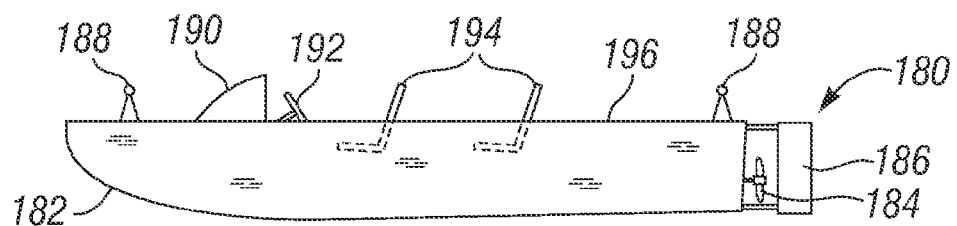

FIG. 12B depicts a boat 180 configured for carrying by an air vehicle. The boat 180 includes a hull 182, propulsion system in the form of one or more propellers 184, and a rudder 186. Note that other propulsion and control systems could also be used, including jet propulsion, bow/rear thrusters, etc. Connectors 188 are configured to mate with connectors on the air vehicle. A windshield 190, steering wheel 192, and seats 194 are configured to fold or otherwise drop below the boat top 196 to facilitate securing the boat 180 to an air vehicle.

Figure 12C:
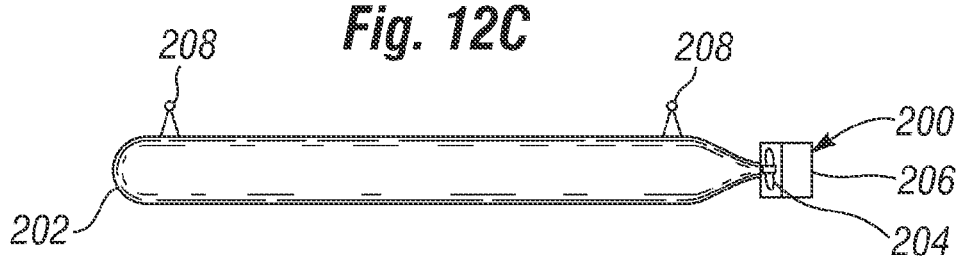

FIG. 12C is a side view of a submersible 200 configured for carrying by an air vehicle. The submersible 200 includes a hull 202, propeller(s) 204, and rudder 206. Connectors 208 are configured to mate with corresponding connectors on the air vehicle, and the submersible's connectors 208 may be configured to fold or otherwise retract into the hull after submersible deployment in order to reduce drag on the submersible 200 when submerged.

Figure 13C:
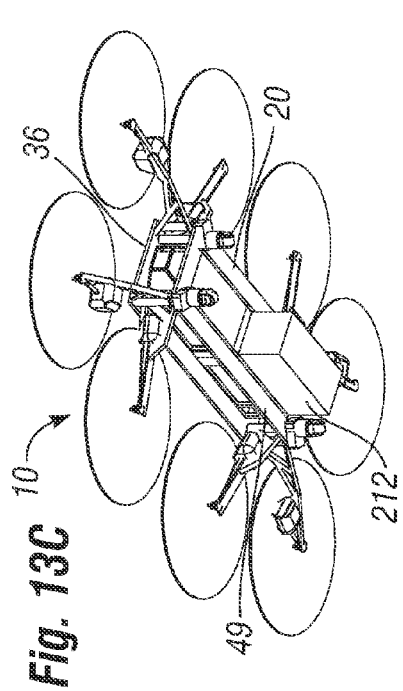
FIG. 13C is a perspective view of the air vehicle with aerial elevator of FIG. 12A with the payload lifted and secured to the exterior of the air vehicle.
Figure 13D:
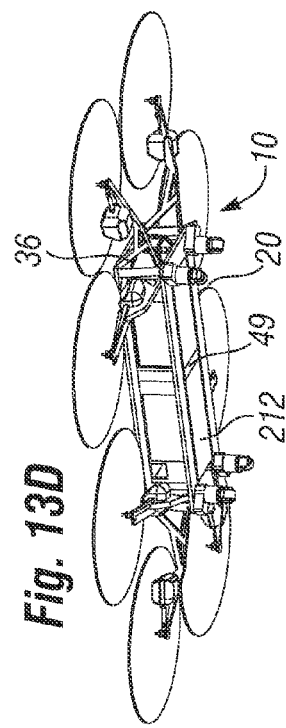
FIG. 13D is a perspective view of an air vehicle with aerial elevator with a payload lifted and secured within the interior of the air vehicle.
Figure 13A:
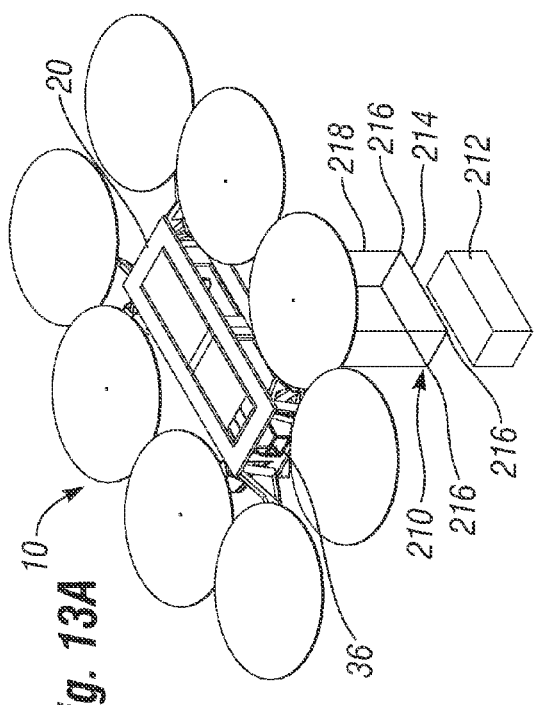
FIG. 13A is a perspective view of an air vehicle with aerial elevator preparing to lift a payload according to an embodiment of the invention.
Figure 13B:
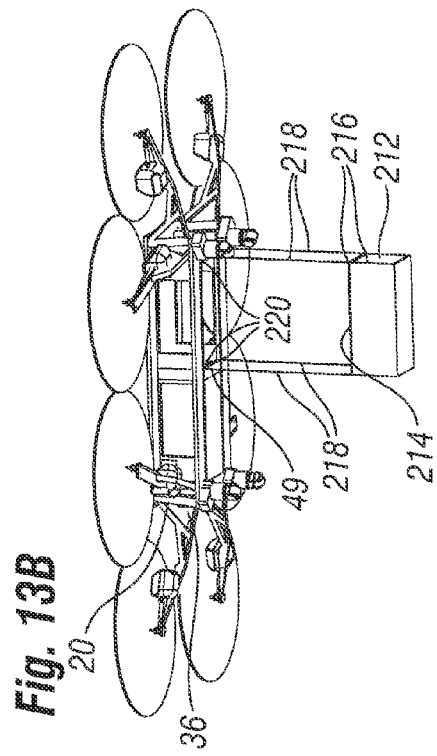
FIG. 13B is a perspective view of the air vehicle with aerial elevator of FIG. 12A lifting the payload.

A vehicle 10 may include an aerial elevator 210 configured to lift a payload 212 to the in-flight air vehicle 20. As depicted in FIGS. 13A-13B, an aerial elevator includes a frame 214 secured at its corners 216 to lift lines 218. Winches 220 or other hoisting devices are used to let out and/or pull in the lift lines 218 and thereby lower or raise the frame 214.

The frame 214 may be a generally rigid structure, which may prevent unwanted movement of lift lines 218 that might occur of the lift lines 218 were unattached to any structure at their lower ends as they were lowered. The frame 214 can include connectors configured to be secured to the payload 212, such as by being mated to corresponding connectors on the payload 212. The frame 214 may also include connectors configured to be secured to the air vehicle 20.

In FIG. 13A, the frame 214 is being lowered toward the payload 212. The frame 214 is then connected to the payload 212 and the frame 214 with attached payload 212 is lifted, as depicted in FIG. 13B, which can be accomplished by using the winches 220 to reel in the lines 218. Once the frame 214 is fully lifted to the underside 49 of the air vehicle 20, the frame 214 can be secured to the air vehicle 20, thereby securing the payload 212 to the air vehicle 20, as depicted in FIG. 13C, with the payload 212 secured to the underside 49 of the air vehicle 20. Alternatively, the payload 212 could be lifted up entirely (or partially) within the air vehicle 20 itself, as depicted in FIG. 13D.

FIG. 14A depicts an air vehicle 20 in flight but tethered to a ground vehicle 14 according to an embodiment of the invention. The tether line 230 has a lower portion 232 secured to a hook 234 or other connection on a landing pad 236 on the ground vehicle 14. The landing pad 236 includes extendable portions 238 that project from the sides of the ground vehicle 14. At the air vehicle 20, the tether line 230 extends from a winch or other reel device configured to pull in and let out the tether line 230.

The tether line 230 can be carried on the air vehicle 20, and then the distal portion 232 thereof dropped to the ground vehicle 14 to be secured to the hook 234. The winch can then be used to pull the air vehicle 20 down onto the landing pad 236, with the end result being the air vehicle 20 is on the landing pad 236 and secured thereto via the tether line 230, as depicted in FIG. 14B. With the air vehicle 20 secured to the landing pad 236, the engine/propeller assemblies 34 can be folded into the sides of the air vehicle 20, and the ground vehicle 14 can drive with the air vehicle 20 secured to the top thereof.

The tether 230 can be used to assist in guiding the air vehicle 20 to land on the ground vehicle 14 (or on other desired locations, such as on a ship, narrow ledge, etc.). The tether 230 could also be used to lift the ground vehicle 14 or other module, either by: winching the ground vehicle 14 via the tether 230 and winch/reel up to an airborne air vehicle 20; or securing the tether 230 to the ground vehicle 14 and using the air vehicle propellers 24 to lift the air vehicle 20 and ground vehicle 14, either by first landing the air vehicle 20 and securing it tightly via the tether 230 to the ground vehicle 14 (so that the ground vehicle 14 is held tightly to the air vehicle 20), or without landing the air vehicle 20 on the ground vehicle 14 so that the ground vehicle 14 will hang some distance below the air vehicle 20 by a section of the tether line 230.

Figure 15:
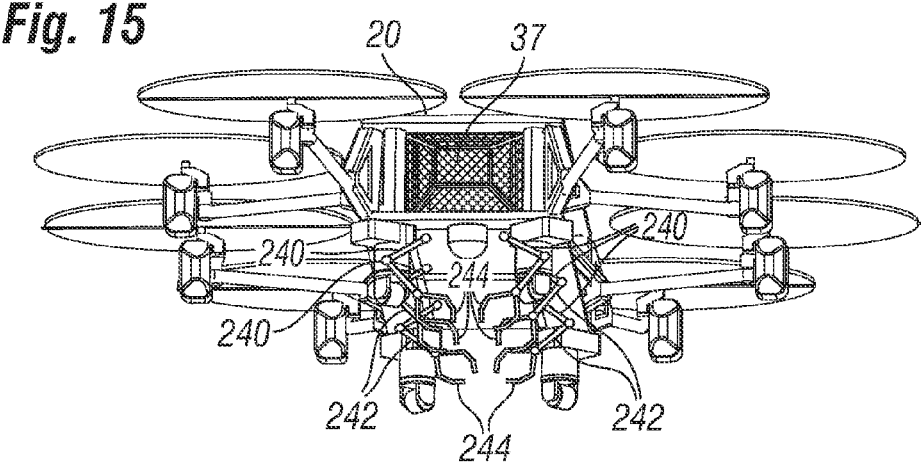
FIG. 15 depicts a perspective view of an air vehicle with graspers according to an embodiment of the invention.

FIG. 15 depicts an air vehicle 20 with graspers 240 extending from the airframe 22. The graspers 240 include arms 242 with hands 244 at the ends thereof. The graspers 240 can be used to grasp and/or release objects, including transport modules, and can be controlled from the cockpit 37, via remote control, etc.

Figure 16A:
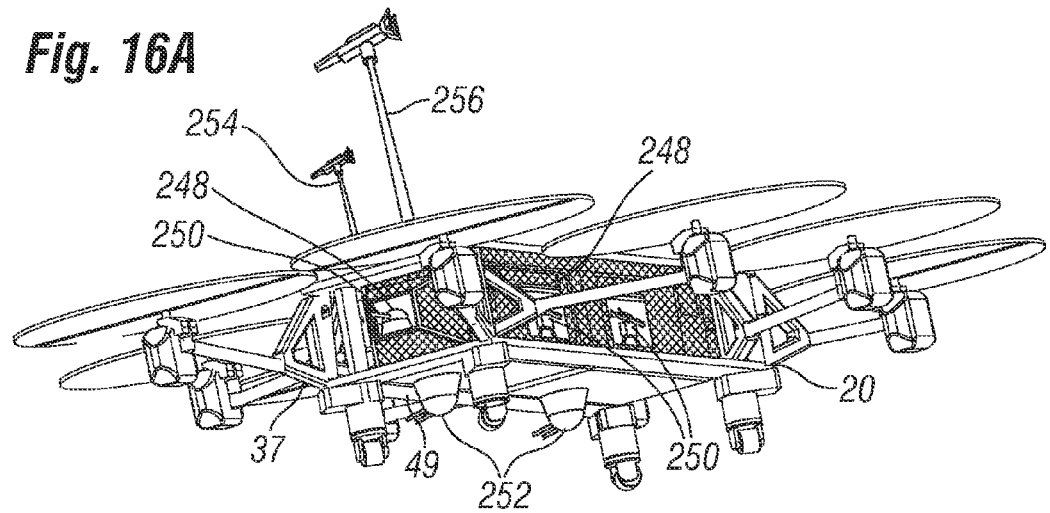
FIGS. 16A and 16B depict perspective and side view, respectively, of air vehicles with armor and gun mounting arrangements according to an embodiment of the invention.
Figure 16B:
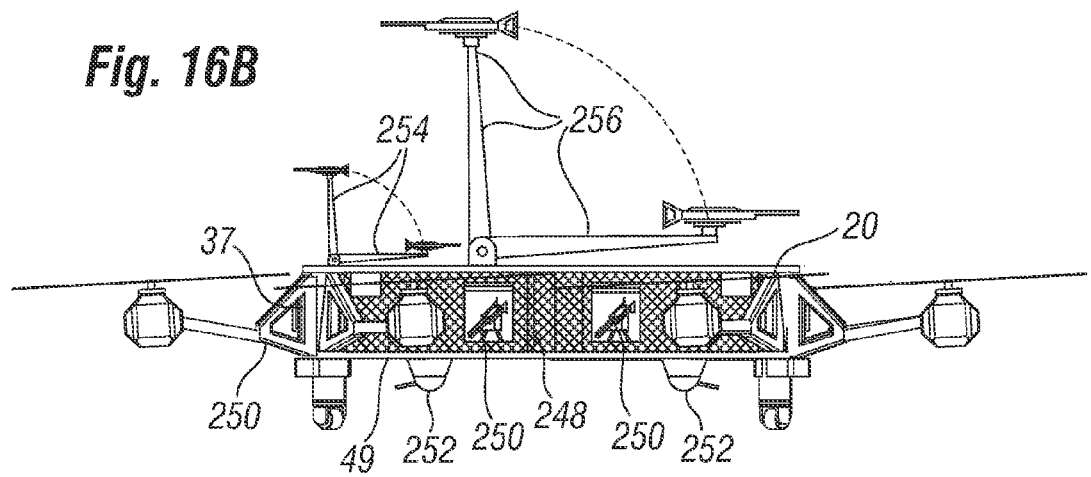

FIGS. 16A and 16B show an air vehicle 20 having armor 248 secured to the sides and bottom thereof. Guns 250 are also provided to extend from the front and sides of the air vehicle 20. Two turret-style guns 252 are secured to the air vehicle bottom 49, while an extendable gun 254 and extendable rocket launcher 256 are positioned on the top 48 of the air vehicle 20. The arms can be controlled from the cockpit 37 or as otherwise desired for a particular application.

FIG. 16C depicts a further embodiment of an air vehicle 20, with an extendable gun turret-style gun 252 secured to an elongate arm 251. The elongate arm 251 is secured to the airframe 22 via a pivot 253 secured to a base form 255 that can rotate about an axis 257 on the top 48 of the airframe 22 adjacent the front 36 thereof. The turret-style gun 252 can rotate about a first axis 259, and also swing up or down for stowing via a hinge 249 that secures the turret-style gun 252 to the elongate arm 251. As depicted in FIG. 16C, the turret-style gun 252 can be positioned above the airframe 22, then rotated over the airframe front 36 to a position below the airframe 22, and moved to a stowed configuration along the top 48 of the airframe 22

Figure 17A:
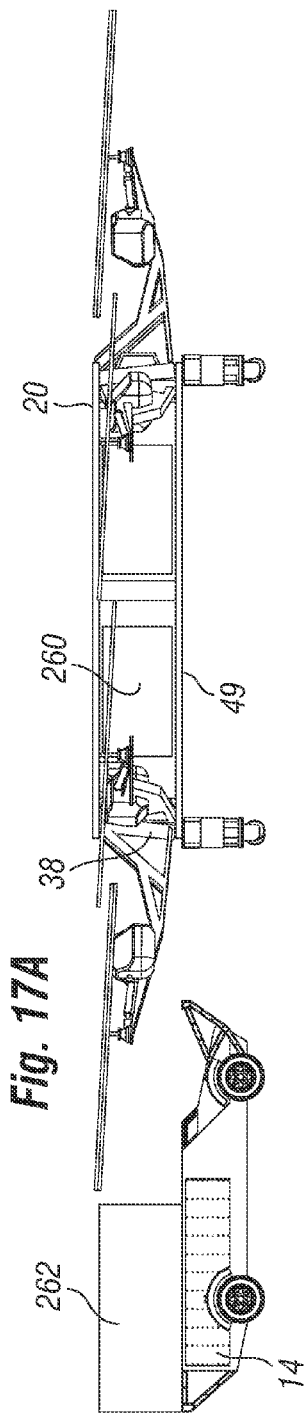
FIGS. 17A and 17B are side and perspective views, respectively, of a ground vehicle loading a cargo module into an air vehicle according to an embodiment of the invention.
Figure 17B:
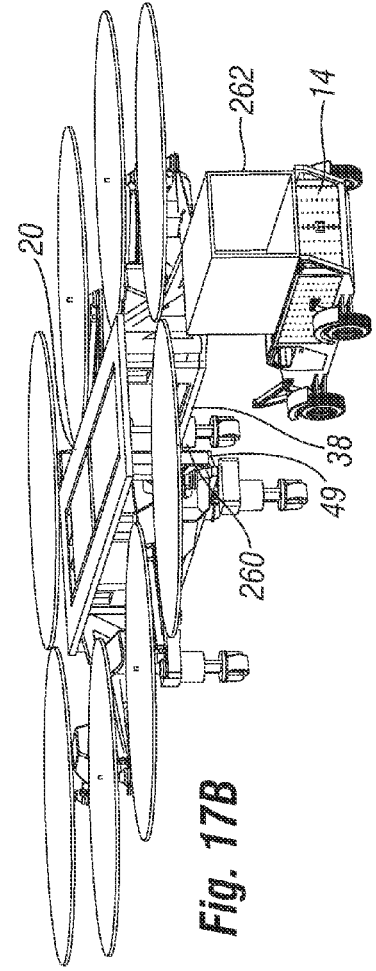
Figure 17C:
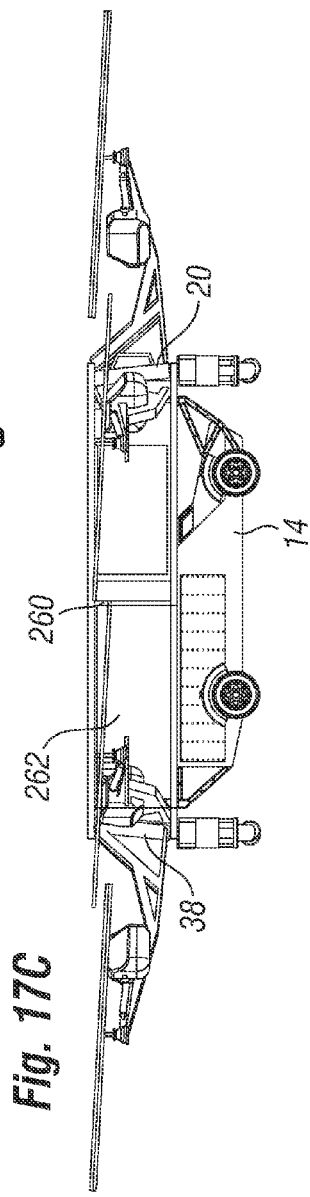
FIG. 17C is a side view of the cargo module and ground vehicle of FIGS. 17A-17B secured to the air vehicle.

FIGS. 17A-17C depict an air vehicle 20 having a rear cargo area 260 that can be open at the air vehicle bottom 49 and at the air vehicle back 38 so that a cargo module 262 can be delivered therein by driving a ground vehicle 14 directly into position beneath the air vehicle 20. As depicted in FIGS. 17A and 17B, the cargo module 262 is positioned on top of the ground vehicle 14, and the ground vehicle 14 is driven toward the air vehicle 20 by approaching the air vehicle 20 from the back 38. As depicted in FIG. 17C, the ground vehicle 14 is driven underneath the air vehicle 20 until the cargo module 262 is positioned inside the rear cargo area 260 of the air vehicle 20. At this point, the cargo module 262 can be secured directly into the rear cargo area 260 and the ground vehicle 14 can be driven away (or simply left behind when the air vehicle 20 takes off), or the ground vehicle 14 can be secured to the air vehicle 20 so that the ground vehicle 14 is delivered to the deployment site along with the cargo module 262.

Figure 18A:
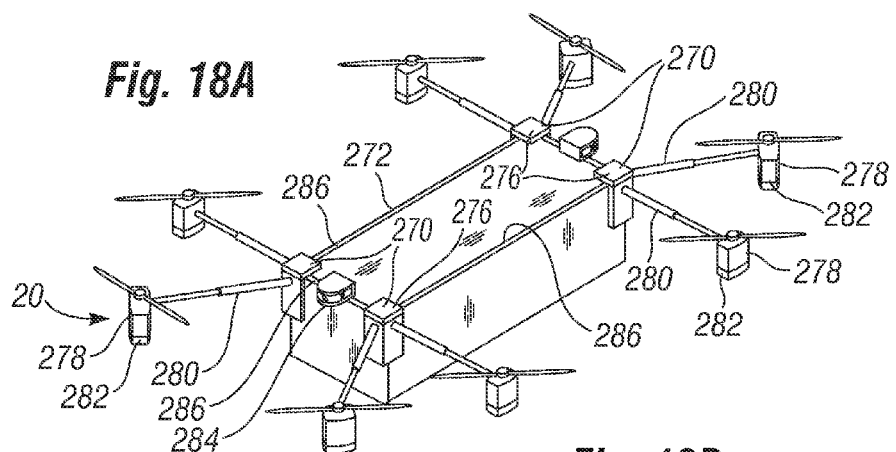
FIG. 18A is a perspective view of an air vehicle comprising flight components releasably attached to a shipping container according to an embodiment of the invention.

FIG. 18A depicts an air vehicle 20 including flight components 270 releasably attached to a shipping container 272 at the corners 274 thereof. The shipping container 272 can be a standard shipping container, and the flight components 270 include a base frame 276 having connectors configured to secure to standard connectors of the shipping container 272. Each flight component 270 comprises two engine/propeller assemblies 278 secured to two supports 280, and also includes one or more fuel tanks 282. A flight control system 284 is also secured to the shipping container 280, and communicates with the flight components via wires 286 and/or wireless connections. The flight control system 284 can control the flight by adjusting engine RPMs/propeller thrust, repositioning propellers/supports at different angles, and/or angling propellers side-to-side and/or front-to-back. An individual flight component 270 is depicted by itself FIG. 18B. Note that a flight control system could be positioned on or in one or more of the individual flight components, with different flight control systems from different flight components communicating (vie wires or wireless) to coordinate control, so that the different flight control systems effectively act as a single flight control system that controls the flight of the entire air vehicle.

Figure 18B:
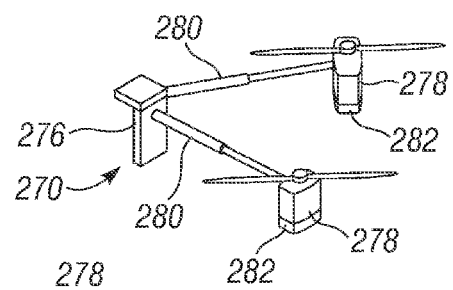
FIG. 18B is a close-up view of a flight component of FIG. 18A.
Figure 18C:
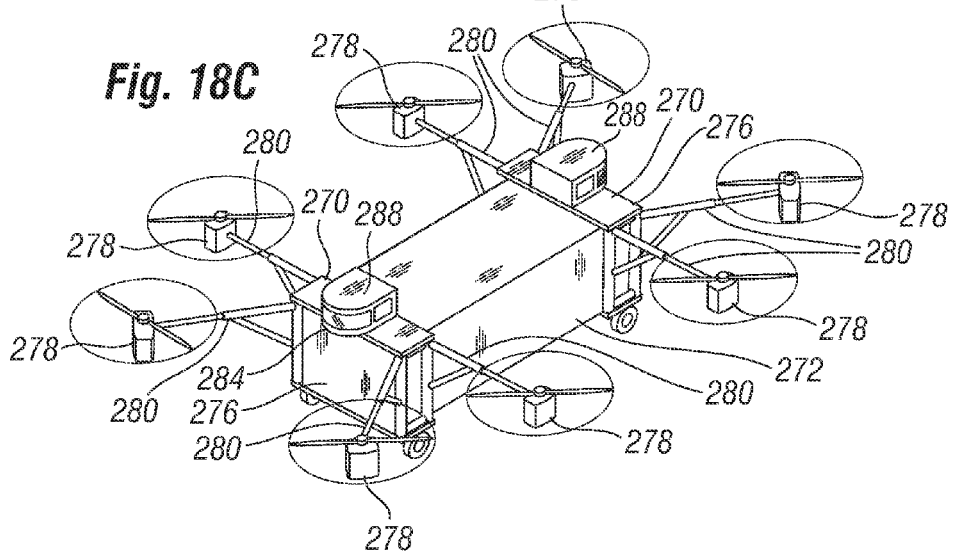
FIG. 18C is a perspective view of an air vehicle comprising flight components releasably attached to a shipping container according to a further embodiment of the invention.

FIG. 18C is another embodiment of an air vehicle 20 that can act as a shipping container transport system, but where each flight component 270 comprises a base frame 276 and four engine/propeller assemblies 278 as well as a flight control system 284 and a cockpit 288 in which a pilot can sit to control the flight component 270 and/or air vehicle 20 (when the flight component is attached thereto). Each flight component 270 can be flown by itself so that it can land and take off from a shipping container 272 and other positions. With two flight components 270 secured to a shipping container 272 (which in the particular embodiment of FIG. 18C involves slipping a flight component base frame 276 over an end of the container 272), the flight control systems 284 of each flight component communicate with each other to coordinate the actions of each flight component 270 and its associated engine/propeller assemblies 278 to lift and transport the shipping container 272 to a desired location.

Individual flight components for moving a shipping container, such as depicted in FIGS. 18A-18C, could include any number of propellers, engines, engine/propeller assemblies, flight control systems, etc. Flight components could be configured so that a single flight component could transport a shipping container without assistance from other flight components, and/or multiple flight components could be secured to a container for transport thereof.

Enhanced flight performance in forward horizontal flight can be achieved by making changes to propeller position and/or power. While in vertical take-off mode it may be desirable for all propellers to be essentially planar with the horizontal, in forward flight one or more of the propellers may be angled forward and/or power may be increased to some propellers and/or reduced or even eliminated to other propellers. FIGS. 19A and 19B depict an air vehicle 20 (similar to that depicted in FIG. 2A) in a forward flight configuration, wherein the front-most propeller set 24a, 24e, front central propeller set 24b, 24f, and rear-most propeller set 24d, 24h are each tilted slightly forward by an angle 114 and at generally the same heights with respect to the airframe 22. However, the rear central propeller set 24c, 24g has been moved substantially, so that the propellers 24c, 24g are at forward tilt angles 114c, 114g of about 90 degrees. The associated propeller/engine assemblies 34c, 34g have been lowered with respect to the airframe 22, which was achieved by lowering the supports 26c, 26g and also by rotating the propeller/engine assemblies 34a, 34g forward. Note that additional propellers, such as the front central propeller set 24b, 24f, could also be rotated forward and/or lowered to achieve even greater speeds. Depending on the particular application, including the lift characteristics of the airframe and propellers, etc.), power could be discontinued the front-most and rear-most propellers during forward flight, and these propellers could be allowed to autorotate in order to generate sufficient lift to maintain the vehicle at a desired altitude.

To transition between vertical take-off mode and horizontal flight, power to the rear central propellers 24c, 24g could be discontinued to prevent tilt propeller transition problems that might occur with powered propellers. The now-unpowered propellers 24c, 24g could then be tilted forward to the desired angle (e.g., 90 degrees), and power restored to the propellers 24c, 24g to provide forward thrust for forward flight. Power to the other (i.e., vertical lift) propellers could be reduced or even eliminated, with the forward-facing propellers 24c, 24g providing most of the power for forward flight and the other propellers 24a, 24b, 24d, 24e, 24f, 24h providing lift either via direct power or autorotation.

Other repositioning of the propellers is also within the scope of the invention. For example, propellers could be repositioned up and down (or in and out), including above and/or below the airframe, to achieve improved aerodynamic performance. Propellers to which power has been eliminated may be secured in a fixed position (such as a position generally parallel to the direction of forward flight in order to minimize drag), or may be permitted to autorotate (in which case they will typically generate some lift). A more aerodynamically efficient shell could be used for and/or with the airframe to give improved performance.

Figure 20A:
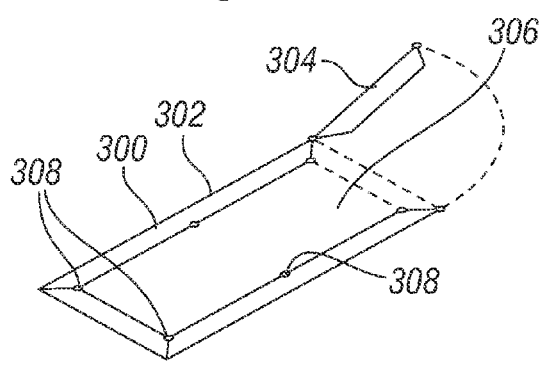
FIGS. 20A and 20B are perspective and (partial) top views, respectively, of an attachment frame according to an embodiment of the invention.
Figure 20B:
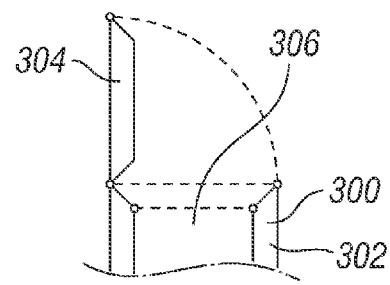
Figure 20C:
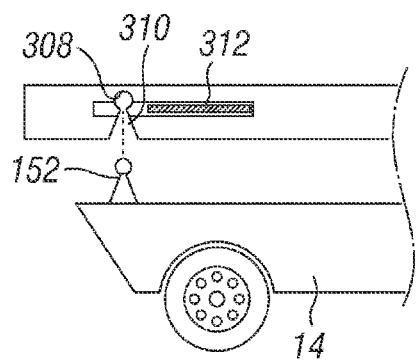
FIGS. 20C and 20D are close-up views of an attachment frame being secured to a ground vehicle according to an embodiment of the invention.
Figure 20D:
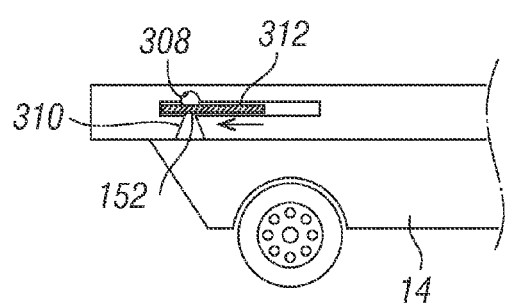

FIGS. 20A and 20B depict a frame 300 configured for attachment to a transport module such as a ground vehicle 14. The frame 300, which could be incorporated into a bottom structure of an airframe, includes a main U-shaped body 302 and a back portion 304, with the back portion 304 configured to be swung away from the main U-shaped body 302 for direct access across the resulting back opening 306. The frame 300 includes connectors 308 adjacent the frame corners and mid-portion in the embodiment of FIGS. 20A and 20B. The connectors 308 are depicted in close-up in FIGS. 20C (engaging) and 20D (locked), and configured to mate with corresponding connectors 152 of the ground vehicle 14. In the particular embodiment depicted, each frame connector 308 has a recess 310 configured to receive a ground vehicle connector 152. A locking member 312 slides across the recess 310 and engages the ground vehicle connector 152 to secure the ground vehicle 14 to the frame 300, as depicted in FIG. 20D.

FIG. 20E depicts a cargo plane 320 delivering an air vehicle 20 using an air drop approach. The air vehicle 20a is depicted in various states of deployment as 20a, 20b, 20c, 20dm 20e, and 20f. The air vehicle 20a is depicted just after having been dropped, with a parachute 322a beginning to deploy. Air vehicle 20b has parachute 322b in a further state of deployment. Parachute 322c has fully stabilized air vehicle 20c, which is in the process of deploying its engine/rotor assemblies 34. Air vehicle 20d is free of its parachute and is in flight via power to the rotors 24.

FIGS. 21A and 21B depict a heavy lift version of an air vehicle 20, having separate decks inside configured to receive equipment and personnel.

Figure 22A:
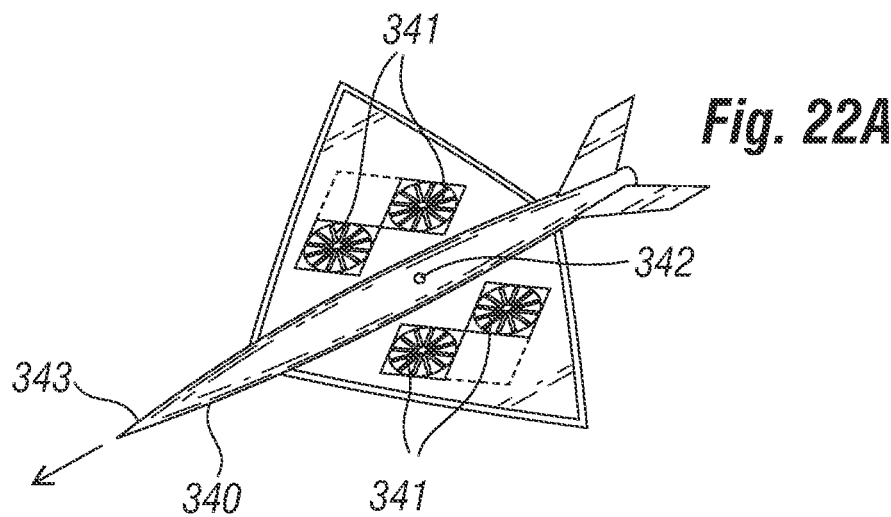
FIGS. 22A and 22B are top views of air vehicles according to embodiments of the invention.
Figure 22B:
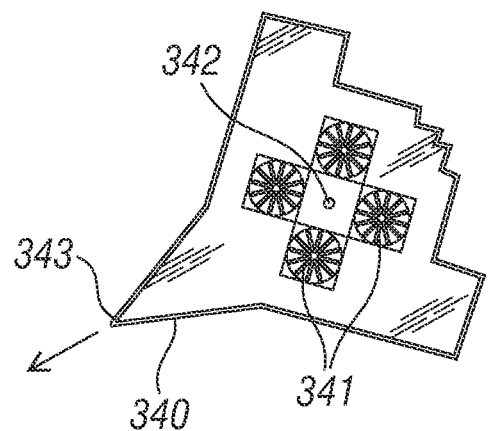
Figure 22C:
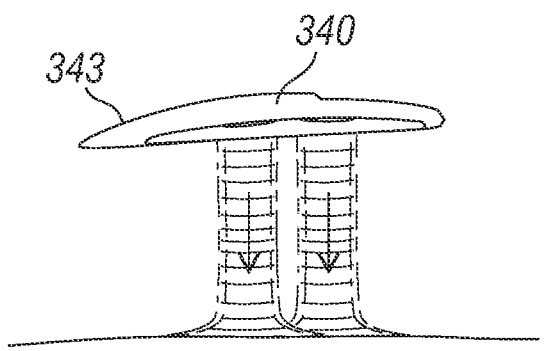
FIG. 22C is a side view of the air vehicle of FIG. 22b.

FIGS. 22A-22C depict a further embodiment of an invention, wherein propeller or ducted fan systems operate and hold an aircraft 340 in stable flight for vertical takeoff and landing and other maneuvering. Different variations of the aircraft 340 are depicted in FIGS. 22A and 22B. The propellers or ducted fans 341 are positioned generally equally about the center of gravity 342, and are covered by doors which can open to provide vertical thrust, and remain closed during horizontal flight. The aircraft has a front 343. A rear directed engine (or ducting to direct propeller/ducted fans rearward) propels the aircraft in horizontal flight.

Figure 23A:
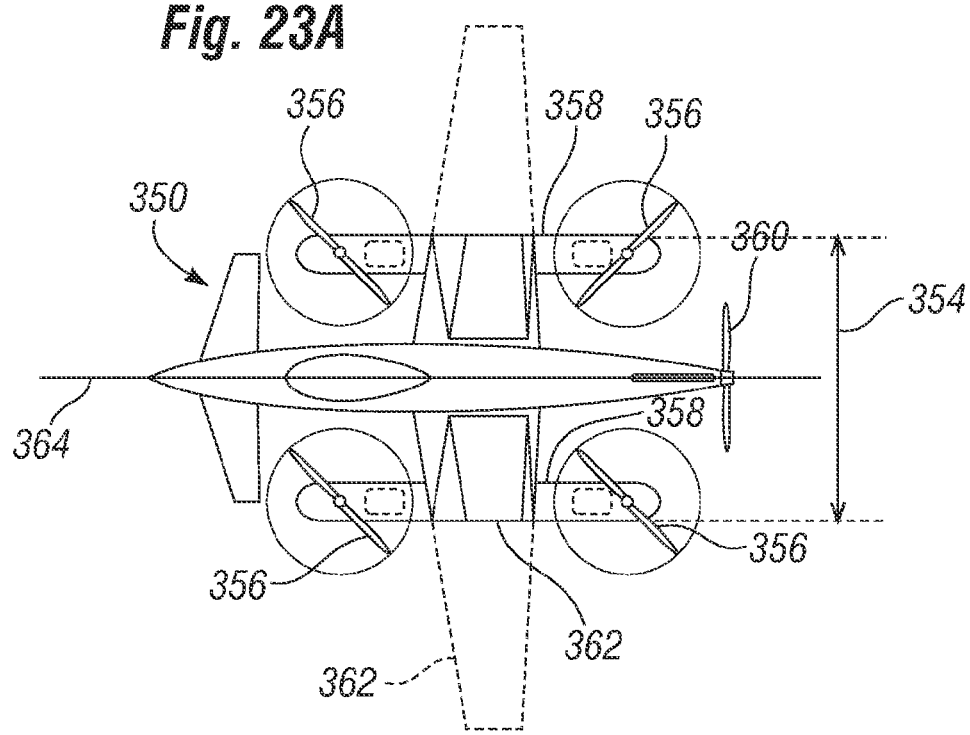
FIGS. 23A and 23B are top and side views, respectively, of an air vehicle according to an embodiment of the invention.
Figure 23B:
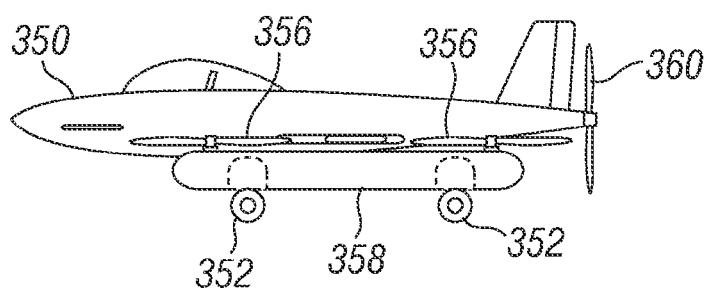

FIGS. 23A and 23B depict a further embodiment of an invention, wherein an air vehicle 350 is configured to drive on the ground in a folded configuration (depicted in FIG. 23A) via wheels 352 extending below to provide steering and/or power. The wheels may be powered from engines driving one or more of the propellers 356, 360. The air vehicle 350 has a folded width 354 that permits it to drive down city streets. Four propellers 356 are positioned on outward pontoons 358, and are configured to provide vertical thrust for VTOL and/or STOL operations. A rear propeller 360 provides forward thrust for horizontal flight and/or driving on the ground. The wings 362 can fold out for flight or fold in for storage and/or ground travel. When in vertical flight, power to the propellers 356 can be reduced and/or eliminated, and/or the propellers can be locked in a position generally parallel to the direction of travel (which would typically be parallel to the forward axis 364 of the aircraft). The engines powering the vertical takeoff propellers could be electric, with batteries in the pontoons 358, and the other propeller(s) 360 could be powered by a more traditional fuel-driven engine that drives the propeller (s) 360 and also charges the batteries that provide electricity to drive the vertical takeoff propellers.

FIGS. 24A and 24B depict an air vehicle 370 having a flight configuration (FIG. 24A) and ground configuration (FIG. 24B). The air vehicle 370 has an upper set of propellers (or ducted fans) 372 configured to rotate to be positioned over the lower set of propellers (or ducted fans) 374 when in the ground configuration. In the ground configuration, the air vehicle 370 can travel down highways and possibly even hover for short hops. A separate engine can provide power to the ground wheels 376 or use one of the air vehicle motors. This vehicle can be ducted fan or propeller driven, and may have a similar vertical takeoff stability system as other flight vehicles described herein. The passengers and drivers sit in the middle section 378. The two upper propellers 372 can rotate from the ground configuration by about 90 degrees so the upper propellers 372 extend out from the sides of the air vehicle 370, thus putting the air vehicle 370 in the flight configuration.

FIGS. 25A-25C depict an embodiment of a flight vehicle 380 that can be launched from a torpedo or missile launch tube 382 as welt as being ground and air launched. FIGS. 25A-25B depict the flight vehicle 380 stowed in a folded configuration (with wings and tail assembly folded up) within a missile launch tube 382, while FIG. 25C depicts the flight vehicle 380 unfolded and in flight. The air vehicle 380 can fly with a forward flight propeller 384 for forward flight and vertical flight propellers 386 for vertical flight. The flight vehicle 380 can be configured to be very portable and to fit in a standard Ohio class missile tube, with a stored width of 7 feet.

Figure 26A:
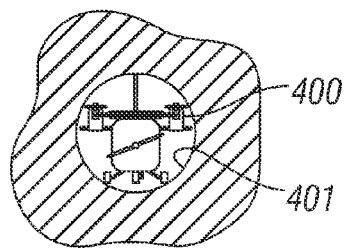
FIGS. 26A-26E are front, top (stored), top (deployed), perspective (vertical takeoff), and perspective (forward flight) views of various configurations of an air vehicle according to an embodiment of the invention.
Figure 26B:
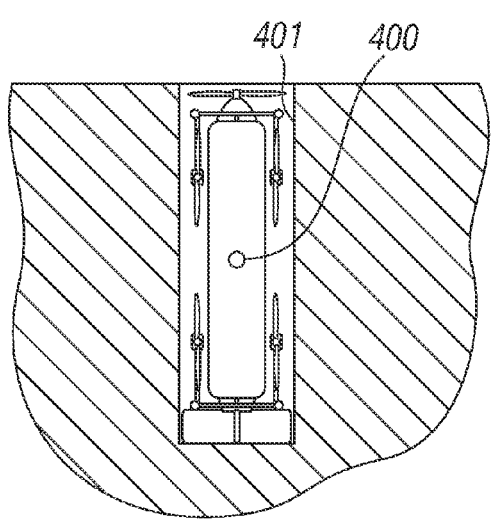
Figure 26C:
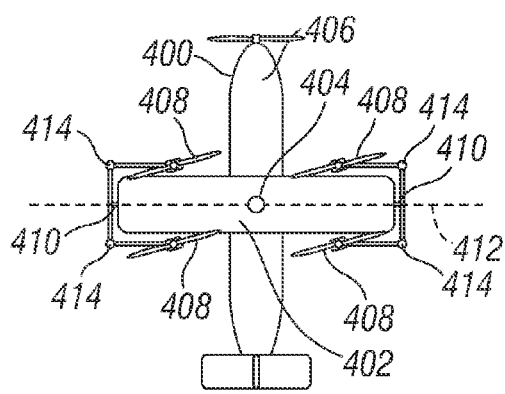
Figure 26D:
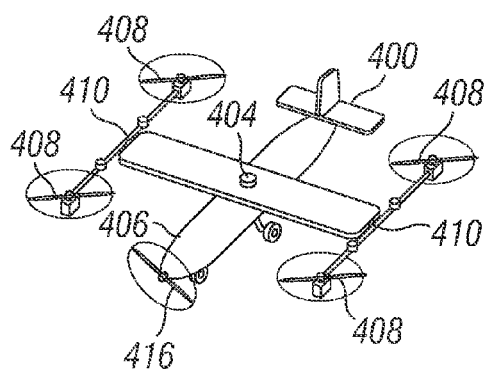
Figure 26E:
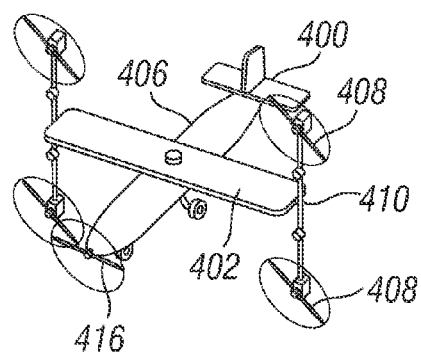

FIGS. 26A-26E depict another flight vehicle 400, with a rotatable wing 402 that rotates on a pivot point 404 defining a generally vertical axis extending from the air vehicle fuselage 406. Propellers 408 are secured to the wing 402 via supports 410, with the supports 410 rotatably secured to the wingtip and capable of rotating about an axis 412 passing generally wingtip-to-wingtip along the wing 402. The entire flight vehicle 400 can be folded up into a compact storage configuration, possibly sized and configured to fit within a launch tube 401 as depicted in FIGS. 26A-26B. The propeller supports 410 are configured to fold along several hinges 414 for storage, as depicted in FIG. 26C. For VTOL and/or STOL, the propellers can be positioned in horizontal configuration (i.e., with essentially no forward/backward, and/or side-to-side tilt), as depicted in FIG. 26E. For forward flight, the propellers 408 can be rotated forward (by rotating the supports 410 about the axis 412) to provide forward thrust, as depicted in FIG. 26F. A dedicated forward thrust propeller 416 may be provided.

While propellers have been discussed herein, rotors could be used in some versions of such air vehicles, such as where the air vehicles are very large and the associated propellers (rotors) have long lengths.

Although the invention has been described in terms of particular embodiments and applications, one of ordinary skill in the art, in light of this teaching, can generate additional embodiments and modifications without departing from the spirit of or exceeding the scope of the claimed invention. For example, although the above devices and methods are described for use in a particular manner, the devices and methods described herein could be used in a variety of different methods of use. As a further example, it will be recognized that the embodiments described above and aspects thereof may be modified, via changes in propeller and/or engine numbers and placement, etc., to adapt a particular situation or device to the teachings of the invention without departing from the essential scope thereof. Accordingly, it is to be understood that the drawings and descriptions of specific embodiments herein are proffered by way of example to facilitate comprehension of the invention, and should not be construed to limit the scope thereof.

What is claimed is:

1. A method of operating a flight vehicle having a plurality of propellers and an airframe, wherein the airframe has an airframe front and defines an airframe plane, comprising:

positioning each of the plurality of propellers with a tilt angle of approximately zero with respect to the airframe plane;

providing power to all of the plurality of motors, wherein the power is sufficient to lift the air vehicle off of the ground so the vehicle is airborne;

with the vehicle airborne, maintaining or increasing power to a first propeller subset comprising one or more of the plurality of motors;

with the vehicle airborne, reducing power to a second propeller subset comprising one or more of the plurality of motors, while simultaneously;

with power reduced or eliminated to the second propeller subset, tilting one or more of the propellers of the second propeller subset forward with respect to the airframe front to a tilt angle of between 60 and 95 degrees;

with the one or more of the propellers of the second propeller subset tilted forward with respect to the airframe front to a tilt angle of between 60 and 95 degrees, increasing power to the second propeller subset.

2. The method of claim 1, further comprising:

after increasing power to the second propeller subset while tilted forward, reducing power to one or more propellers of the first propeller subset.

3. The method of claim 2, wherein reducing power to the one or more propellers of the first propeller subset comprises eliminating power to the one or more propellers of the first propeller subset.

4. The method of claim 1, wherein the airframe comprises an airframe back, and propellers of the first subset of propellers are positioned generally adjacent the airframe front and airframe back.

5. The method of claim 4, wherein propellers of the second subset of propellers are positioned generally between airframe front and airframe back.

6. The method of claim 1, wherein propellers of the second subset of propellers are positioned generally between the propellers of the first subset of propellers.

7. The method of claim 1, wherein the propellers of the second subset of propellers are positioned at a height with respect to the airframe, and further comprising:

changing the height of one or more of the propellers of the second subset of propellers, wherein changing height of the one or more propellers of the second subset of propellers occurs after the vehicle is airborne and before increasing power to the second propeller subset.

* * * * *